US012634208B2

(12) United States Patent
Makam et al.

(10) Patent No.: US 12,634,208 B2
(45) Date of Patent: May 19, 2026

(54) SERVICE-LEVEL DETECTION OF LATENCY ANOMALIES IN A COMPUTING PLATFORM

(71) Applicant: Microsoft Technology Licensing, LLC, Redmond, WA (US)

(72) Inventors: Sri Harsha Makam, Redmond, WA (US); Jeffrey Xin Li, Kirkland, WA (US); Manish Kumar, Secaucus, NJ (US); Yingnong Dang, Sammamish, WA (US); Minghua Ma, Beijing (CN); Wei Wu, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 126 days.

(21) Appl. No.: 18/427,885

(22) Filed: Jan. 31, 2024

(65) Prior Publication Data
US 2025/0247308 A1 Jul. 31, 2025

(51) Int. Cl.
H04L 41/5019 (2022.01)
G06F 11/07 (2006.01)
(Continued)

(52) U.S. Cl.
CPC ...... H04L 41/5019 (2013.01); H04L 43/0864 (2013.01)

(58) Field of Classification Search
CPC ............. H04L 41/5019; H04L 43/0864; H04L 41/5009; H04L 43/0852; H04L 41/16;
(Continued)

(56) References Cited

U.S. PATENT DOCUMENTS 11,509,946 B1 * 11/2022 Liu ........................ H04L 65/70
2005/0097536 A1 5/2005 Bernstein et al.
(Continued)

OTHER PUBLICATIONS

European Search Report and Written Opinion for EP24223025, mailing date May 23, 2025 (received in electronic form on May 23, 2025), 14 pages.

(Continued)

*Primary Examiner* — Kamal M Hossain

(57) ABSTRACT
A technique detects latency-related anomalies that occur in performing provisioning actions in a network-accessible computing platform. Illustrative provisioning actions include creating a resource (e.g., a virtual machine), updating the resource, and deleting the resource. The technique operates by detecting and reporting the latency-related anomalies on a service-level granularity. The technique also provides access to operation-level latency-related data to assist in diagnosing the causes of the anomalies. In some implementations, the technique consolidates incidents that potentially reveal a common source of failure into a single report. In some implementations, the technique interacts with a machine-trained language model to confirm whether a reported incident is a false positive which does not warrant further action. The technique performs this function by sending a prompt to the language model that expresses a current incident and one or more prior incidents that have been determined to match the current incident.

20 Claims, 11 Drawing Sheets

FIRST OVERVIEW OF OPERATION OF THE COMPUTING SYSTEM, 1002

GENERATE, FOR A PROVISIONING ACTION, LATENCY PROFILE INFORMATION INCLUDING SERVICE-LEVEL DISTRIBUTION INFORMATION THAT EXPRESSES DISTRIBUTION OF AMOUNTS OF TIME THAT HAVE BEEN TAKEN TO PERFORM EACH OF A PLURALITY OF SERVICES INCLUDED IN THE PROVISIONING ACTION, THE SERVICE-LEVEL DISTRIBUTION INFORMATION BEING GENERATED BASED AT LEAST ON A SUMMATION OF NON-OVERLAPPING PORTIONS OF LATENCIES OF A PLURAL OF EXECUTABLE OPERATIONS INCLUDED IN EACH SERVICE OF TWO OR MORE OF THE PLURALITY OF SERVICES.
1004

DETERMINE THAT A REPORTABLE INCIDENT HAS OCCURRED THAT IS ATTRIBUTABLE TO A PARTICULAR SERVICE OF THE PLURALITY OF SERVICES BASED ON A DEVIATION IN THE SERVICE-LEVEL DISTRIBUTION INFORMATION THAT SATISFIES A PRESCRIBED TEST.
1006

ADJUST ONE OR MORE CONTROL SETTINGS THAT GOVERN DETERMINATION THAT REPORTABLE INCIDENTS HAVE OCCURRED BASED ON THE REPORTABLE INCIDENT.
1008

(51) Int. Cl.

| | |
|---|---|
| *G06F 11/34* | (2006.01) |
| *G06N 3/08* | (2023.01) |
| *G06N 20/00* | (2019.01) |
| *H04L 41/14* | (2022.01) |
| *H04L 41/142* | (2022.01) |
| *H04L 41/16* | (2022.01) |
| *H04L 41/5009* | (2022.01) |
| *H04L 41/5025* | (2022.01) |
| *H04L 43/0852* | (2022.01) |
| *H04L 43/0864* | (2022.01) |
| *H04L 43/16* | (2022.01) |
| *G06N 3/045* | (2023.01) |

(58) Field of Classification Search
CPC ... H04L 41/142; H04L 41/5025; H04L 43/16; H04L 41/145; G06F 11/079; G06F 11/0709; G06F 11/0757; G06F 11/0793; G06F 11/3419; G06F 11/3452; G06N 3/045; G06N 3/08; G06N 20/00
See application file for complete search history.

(56) References Cited

U.S. PATENT DOCUMENTS

| | | | | |
|---|---|---|---|---|
| 2006/0276995 A1* | 12/2006 | Breitgand | ........... | H04L 41/5003 702/179 |
| 2020/0052979 A1* | 2/2020 | Clemm | ................... | H04L 67/51 |
| 2021/0149760 A1 | 5/2021 | Sethi et al. | | |
| 2021/0406109 A1 | 12/2021 | Kulaga et al. | | |
| 2022/0066912 A1* | 3/2022 | Shetty | ................. | G06F 11/3495 |
| 2022/0086060 A1 | 3/2022 | Tamir et al. | | |
| 2022/0172067 A1 | 6/2022 | Kang et al. | | |
| 2024/0161112 A1* | 5/2024 | Gao | ....................... | G06F 9/4887 |
| 2025/0028629 A1* | 1/2025 | Agrawal | ............. | G06F 11/3684 |
| 2025/0150474 A1* | 5/2025 | Jones | ................... | G06N 3/0455 |
| 2025/0150503 A1* | 5/2025 | Cropper | .................. | H04L 67/10 |

OTHER PUBLICATIONS

Wei, et al., "Chain-of-Thought Prompting Elicits Reasoning in Large Language Models," arXiv, arXiv:2201.11903v6 [cs. CL], Jan. 10, 2023, 43 pages.

"AWS Fault Isolation Boundaries," available at https://docs.aws.amazon.com/pdfs/whitepapers/latest/aws-fault-isolation-boundaries/aws-fault-isolation-boundaries.pdf#abstract-and-introduction, AWS Whitepaper, Amazon.com, Inc., Seattle, WA, Nov. 16, 2022, 30 pages.

"What is Azure Resource Manager?," available at https://learn.microsoft.com/en-us/azure/azure-resource-manager/management/overview, Microsoft Corporation, Redmond, WA, Nov. 20, 2023, 7 pages.

"What are Virtual Machine Scale Sets?," available at https://learn.microsoft.com/en-us/azure/virtual-machine-scale-sets/overview, Microsoft Corporation, Redmond, WA, Apr. 10, 2023, 3 pages.

Roman, Pierre, "VMSS, VMSS Flex, what are they? And what's the differences?," available at https://techcommunity.microsoft.com/t5/ itops-talk-blog/vmss-vmss-flex-what-are-they-and-what-s-the-differences/ba-p/2452028, Microsoft Corporation, Redmond, WA, Jun. 16, 2021, 9 pages.

Kondrashchenko, Iryna, "Dynamic Few-Shot Prompting:Overcoming Context Limit for ChatGPT Text Classification," available at https://medium.com/@iryna230520/dynamic-few-shot-prompting-overcoming-context-limit-for-chatgpt-text-classification-2f70c3bd86f9, Medium, Jun. 12, 2023, 10 pages.

"Azure control plane and data plane," available at https://learn.microsoft.com/en-us/azure/azure-resource-manager/management/control-plane-and-data-plane, Microsoft Corporation, Redmond, WA, Aug. 4, 2023, 3 pages.

Traini, et al., "DeLag: Using Multi-Objective Optimization to Enhance the Detection of Latency Degradation Patterns in Service-based Systems," arXiv, arXiv:2110.11155v4 [cs.SE], Apr. 7, 2023, 28 pages.

Anand, et al., "Aggregate-Driven Trace Visualizations for Performance Debugging," arXiv, arXiv:2010.13681v1 [cs.DC], Oct. 26, 2020, 7 pages.

"Distributed tracing in a microservices application," available at https://cloud.google.com/architecture/microservices-architecture-distributed-tracing, Cloud Architecture Center, Google Cloud, Google LLC, Mountain View, CA, accessed on Nov. 18, 2023, Google LLC, 18 pages.

"What are Exclusive and Inclusive ?! ," available at https://learn.microsoft.com/en-us/archive/blogs/profiler/what-are-exclusive-and-inclusive, Microsoft Corporation, Redmond, WA, Jun. 9, 2004, 3 pages.

"Overview of Service Fabric clusters on Azure," available at https://learn.microsoft.com/en-us/azure/service-fabric/service-fabric-azure-clusters-overview, Microsoft Corporation, Redmond, WA, Jul. 17, 2022, 6 pages.

Duc, Cuong Nguyen, "Day 5: Mastering Latency Metrics: Understanding P90, P95, and P99," available at https://www.linkedin.com/pulse/day-5-mastering-latency-metrics-understanding-p90-p95-nguyen-duc, Jun. 8, 2023, 5 pages.

"Azure availability zones," available at https://azure.microsoft.com/en-us/explore/global-infrastructure/availability-zones#features, Microsoft Corporation, Redmond, WA, accessed on Nov. 24, 2023, 8 pages.

"Inside Azure Datacenter Architecture with Mark Russinovich," https://www.youtube.com/watch?v=69PrhWQorEM, presentation by Mark Russinovich, Youtube introductory page, Mar. 8, 2021, 2 pages.

Vaswani, et al., "Attention Is All You Need," in 31st Conference on Neural Information Processing Systems (NIPS 2017), 2017, 11 pages.

Devlin, et al., "BERT: Pre-training of Deep Bidirectional Transformers for Language Understanding," arXiv, arXiv:1810.04805v2 [cs.CL], May 24, 2019, 16 pages.

Touvron, et al., "LLaMA: Open and Efficient Foundation Language Models," arXiv, arXiv:2302.13971v1 [cs.CL], Feb. 27, 2023, 27 pages.

Scao, et al., "Bloom: A 176B-Parameter Open-Access Multilingual Language Model," arXiv, arXiv:2211.05100v2 [cs.CL], Dec. 11, 2022, 62 pages.

Communication pursuant to Article 94(3) EPC received for European Application No. 24223025.8, mailed on Mar. 13, 2026, 10 pages.

\* cited by examiner

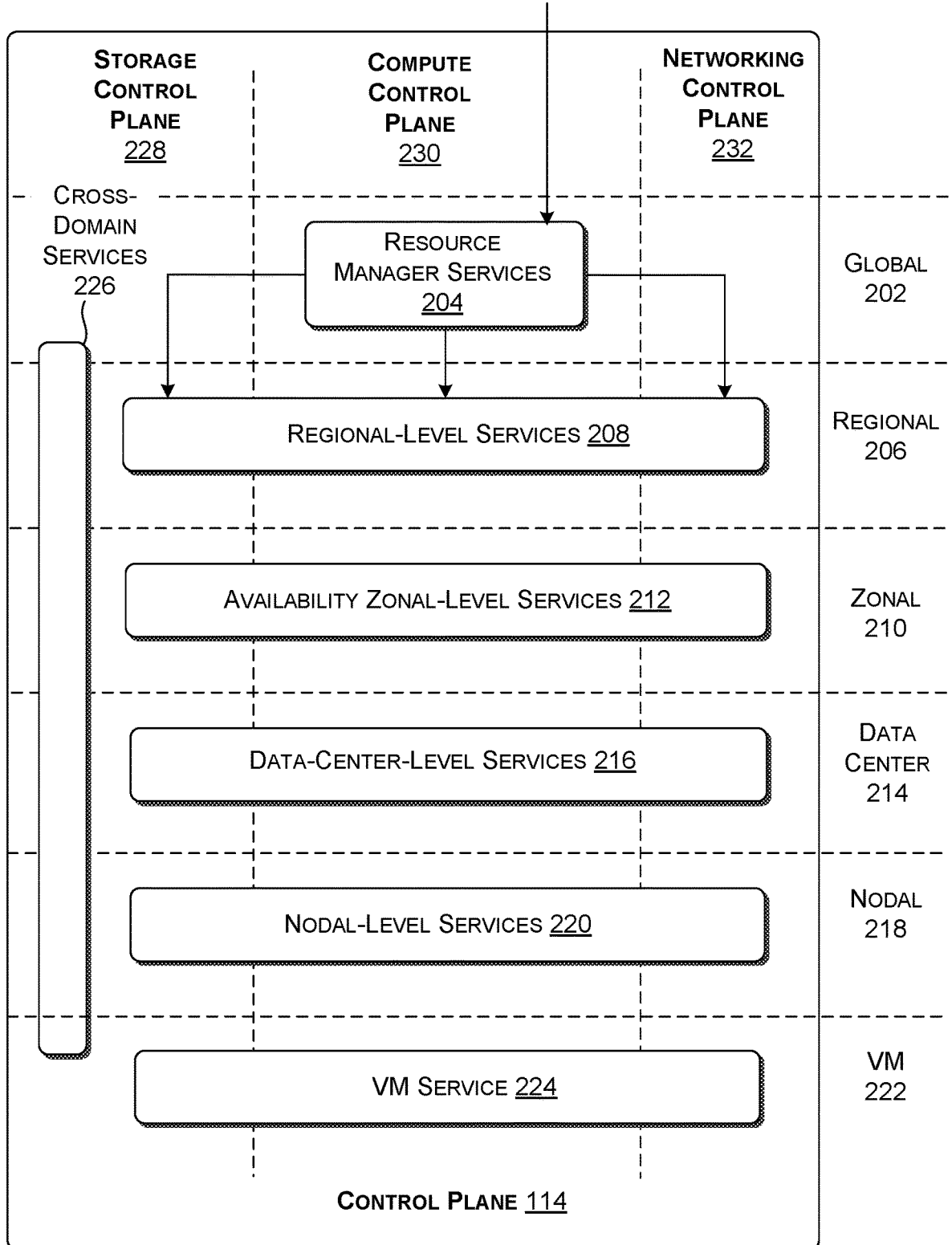

PROVISIONING ACTION ASSOCIATED
WITH THE PARTICULAR SCENARIO

STORAGE CONTROL PLANE 228

COMPUTE CONTROL PLANE 230

NETWORKING CONTROL PLANE 232

CROSS-DOMAIN SERVICES 226

RESOURCE MANAGER SERVICES 204

GLOBAL 202

REGIONAL-LEVEL SERVICES 208

REGIONAL 206

AVAILABILITY ZONAL-LEVEL SERVICES 212

ZONAL 210

DATA-CENTER-LEVEL SERVICES 216

DATA CENTER 214

NODAL-LEVEL SERVICES 220

NODAL 218

VM SERVICE 224

VM 222

CONTROL PLANE 114

FIG. 2

TRANSFORMER-
BASED MODEL

902

POST-PROCESSING COMPONENT 926

OUTPUT EMBEDDING INFORMATION 924

928

NTH TRANSFORMER COMPONENT 922

SECOND TRANSFORMER COMPONENT 920

918

ADD & NORMALIZE COMPONENT 2
914

FFN COMPONENT
912

ADD & NORMALIZE COMPONENT 1
910

ATTENTION HEAD 1
916

ATTENTION
COMPONENT
908

FIRST TRANSFORMER
COMPONENT 904

906

930

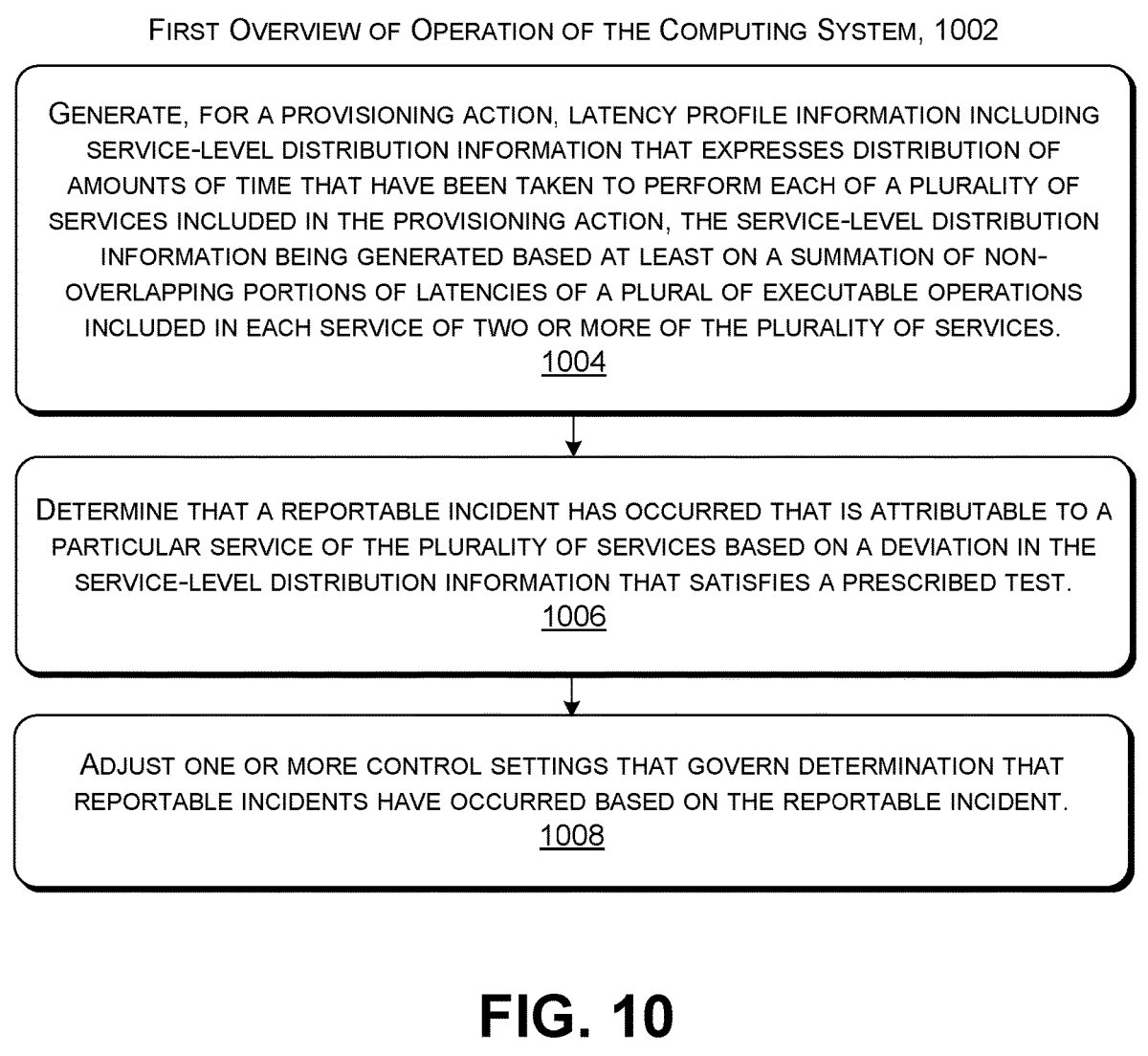

FIRST OVERVIEW OF OPERATION OF THE COMPUTING SYSTEM, 1002

GENERATE, FOR A PROVISIONING ACTION, LATENCY PROFILE INFORMATION INCLUDING SERVICE-LEVEL DISTRIBUTION INFORMATION THAT EXPRESSES DISTRIBUTION OF AMOUNTS OF TIME THAT HAVE BEEN TAKEN TO PERFORM EACH OF A PLURALITY OF SERVICES INCLUDED IN THE PROVISIONING ACTION, THE SERVICE-LEVEL DISTRIBUTION INFORMATION BEING GENERATED BASED AT LEAST ON A SUMMATION OF NON-OVERLAPPING PORTIONS OF LATENCIES OF A PLURAL OF EXECUTABLE OPERATIONS INCLUDED IN EACH SERVICE OF TWO OR MORE OF THE PLURALITY OF SERVICES.
1004

DETERMINE THAT A REPORTABLE INCIDENT HAS OCCURRED THAT IS ATTRIBUTABLE TO A PARTICULAR SERVICE OF THE PLURALITY OF SERVICES BASED ON A DEVIATION IN THE SERVICE-LEVEL DISTRIBUTION INFORMATION THAT SATISFIES A PRESCRIBED TEST.
1006

ADJUST ONE OR MORE CONTROL SETTINGS THAT GOVERN DETERMINATION THAT REPORTABLE INCIDENTS HAVE OCCURRED BASED ON THE REPORTABLE INCIDENT.
1008

FIG. 10

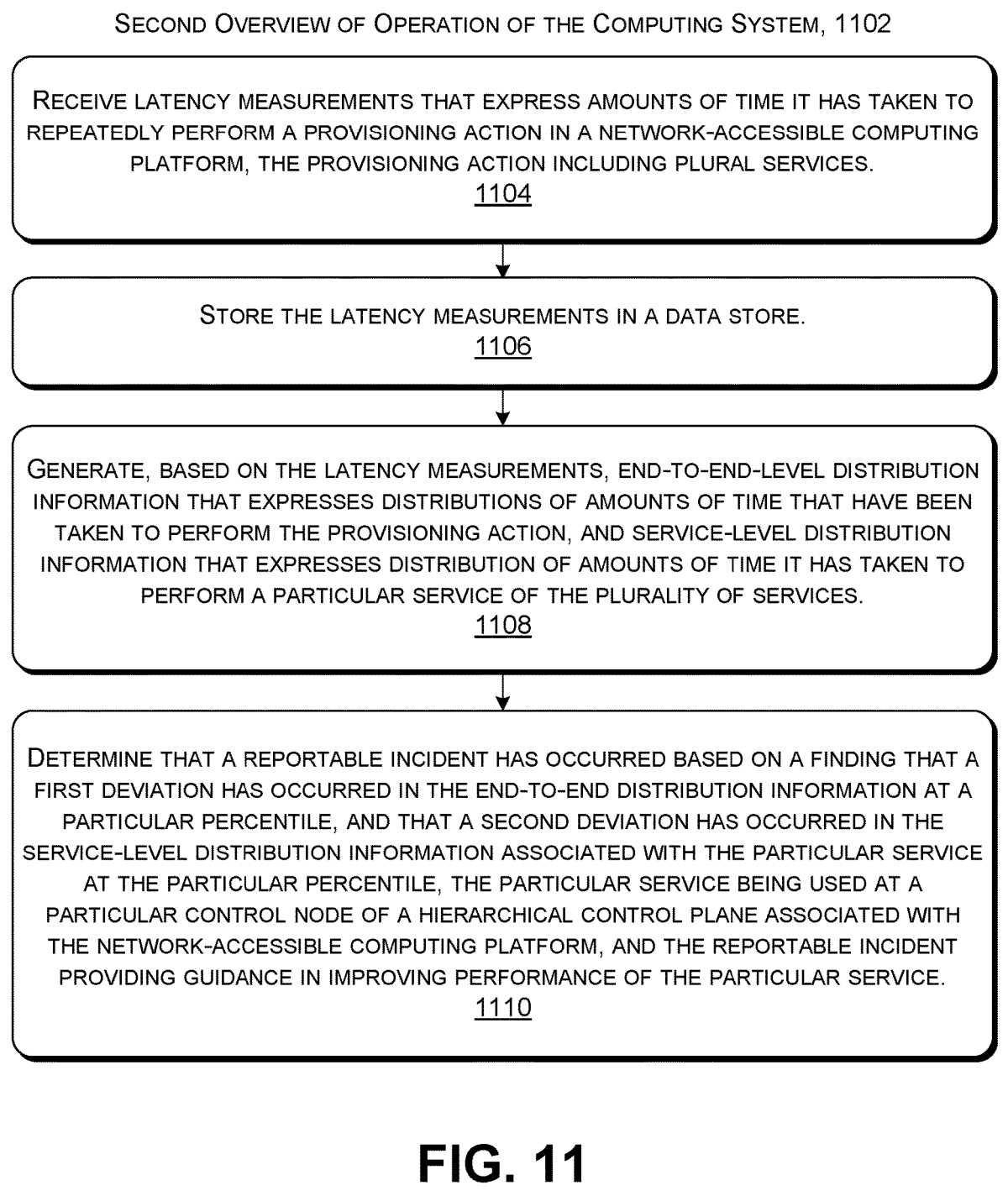

SECOND OVERVIEW OF OPERATION OF THE COMPUTING SYSTEM, 1102

RECEIVE LATENCY MEASUREMENTS THAT EXPRESS AMOUNTS OF TIME IT HAS TAKEN TO REPEATEDLY PERFORM A PROVISIONING ACTION IN A NETWORK-ACCESSIBLE COMPUTING PLATFORM, THE PROVISIONING ACTION INCLUDING PLURAL SERVICES.
1104

STORE THE LATENCY MEASUREMENTS IN A DATA STORE.
1106

GENERATE, BASED ON THE LATENCY MEASUREMENTS, END-TO-END-LEVEL DISTRIBUTION INFORMATION THAT EXPRESSES DISTRIBUTIONS OF AMOUNTS OF TIME THAT HAVE BEEN TAKEN TO PERFORM THE PROVISIONING ACTION, AND SERVICE-LEVEL DISTRIBUTION INFORMATION THAT EXPRESSES DISTRIBUTION OF AMOUNTS OF TIME IT HAS TAKEN TO PERFORM A PARTICULAR SERVICE OF THE PLURALITY OF SERVICES.
1108

DETERMINE THAT A REPORTABLE INCIDENT HAS OCCURRED BASED ON A FINDING THAT A FIRST DEVIATION HAS OCCURRED IN THE END-TO-END DISTRIBUTION INFORMATION AT A PARTICULAR PERCENTILE, AND THAT A SECOND DEVIATION HAS OCCURRED IN THE SERVICE-LEVEL DISTRIBUTION INFORMATION ASSOCIATED WITH THE PARTICULAR SERVICE AT THE PARTICULAR PERCENTILE, THE PARTICULAR SERVICE BEING USED AT A PARTICULAR CONTROL NODE OF A HIERARCHICAL CONTROL PLANE ASSOCIATED WITH THE NETWORK-ACCESSIBLE COMPUTING PLATFORM, AND THE REPORTABLE INCIDENT PROVIDING GUIDANCE IN IMPROVING PERFORMANCE OF THE PARTICULAR SERVICE.
1110

FIG. 11

INTERACTING WITH THE LANGUAGE MODEL, 1202

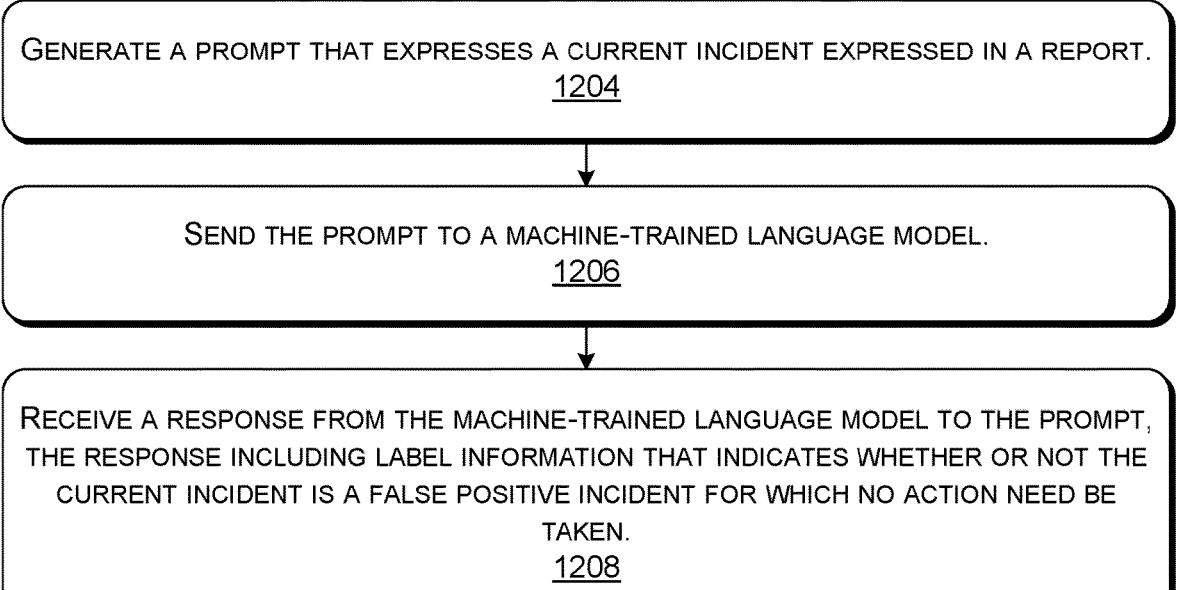

GENERATE A PROMPT THAT EXPRESSES A CURRENT INCIDENT EXPRESSED IN A REPORT.
1204

SEND THE PROMPT TO A MACHINE-TRAINED LANGUAGE MODEL.
1206

RECEIVE A RESPONSE FROM THE MACHINE-TRAINED LANGUAGE MODEL TO THE PROMPT, THE RESPONSE INCLUDING LABEL INFORMATION THAT INDICATES WHETHER OR NOT THE CURRENT INCIDENT IS A FALSE POSITIVE INCIDENT FOR WHICH NO ACTION NEED BE TAKEN.
1208

FIG. 12

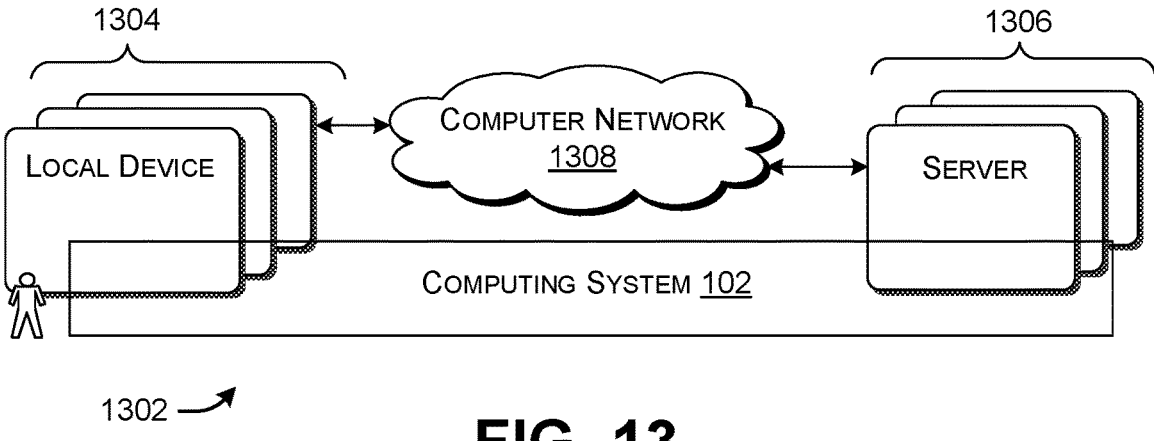

1304

1306

LOCAL DEVICE

COMPUTER NETWORK
1308

SERVER

COMPUTING SYSTEM 102

SERVICE-LEVEL DETECTION OF LATENCY ANOMALIES IN A COMPUTING PLATFORM

BACKGROUND

A network-accessible computing platform typically provides a complex control plane for use in creating, updating, and deleting resources. The resources include virtual machines, storage resources, and network-related resources. The complexity of the control plane makes it challenging to quickly detect and diagnose substandard performance in the computing platform. Detection quality for latency anomalies is gauged using any combination of metrics, such as accuracy, precision, and recall. One category of substandard performance occurs when a requested provisioning action exhibits unsatisfactory latency. Latency refers to the amount of time it takes to perform the requested provisioning action.

A network-accessible system that exhibits poor latency-related performance reduces the efficiency at which provisioning actions are completed. For example, poor latency-related performance causes delays in creating and deleting virtual machines. This results in a waste of both computer-related and human resources. Poor latency-related performance also results in user interface presentations that do not provide timely feedback to input actions.

SUMMARY

A technique is described herein for detecting latency-related anomalies that occur in performing provisioning actions in a network-accessible computing platform. Illustrative provisioning actions include creating resources (e.g., a virtual machine), updating resources, and deleting resources. Each provisioning action is made up of plural services, and each of these services includes one or more executable operations. An "anomaly," as used here, refers to substandard performance that satisfies a prescribed test.

According to illustrative implementations, the technique detects and reports the latency-related anomalies on a service-level granularity. The technique also provides access to operation-level data to assist in diagnosing the causes of the anomalies.

In some implementations, the technique generates latency profile information based on a series of latency measurements. The latency profile information describes distributions of end-to-end latencies, distributions of service-level latencies, etc. In some implementations, the technique identifies potential latency-related anomalies based on a combination of an end-to-end-level distribution information and at least one instance of service-level distribution information.

In some implementations, the technique consolidates incidents that potentially reveal a common source of failure into a single report.

In some implementations, the technique interacts with a machine-trained language model to confirm whether a reported incident is a false positive which does not warrant further action. The technique operates by generating a prompt that describes: the current incident; one or more prior incidents that have been determined to match the current incident; and one or more comments pertaining to the current incident. The machine-trained language model produces label information based on the prompt. The label information describes whether or not the current incident is a false positive. In some implementations, an adjustment service modifies one or more control settings based on the label information produced by the machine-trained language model. These modifications affect the subsequent generation of latency alerts, e.g., by reducing the number of false positives that are generated.

Among other technical characteristics, the technique enables anomalies within a network-accessible computing platform to be more quickly identified and resolved. This has the effect of reducing both the amount of manual effort and system resources devoted to the task of analyzing and acting on anomalies within network-accessible computing platform. The timely resolution of the anomalies also has the net effect of reducing the amount of time required to perform provisional-related actions, such as setting up and deleting virtual machines.

Reporting on a service-level granularity is particularly useful because it provides valuable assistance in detecting sources of error within a complex control plane. For instance, reporting on a service-level granularity is effective in pinpointing errors caused by a particular version of a service that manifests itself at a particular layer in the control plane and at a particular geographic location. In contrast to service-level reporting, reporting on an operation-level granularity results in a voluminous amount of operation-level reports that are not readily actionable by recipients. This is because individual operation-level reports often fail to provide assistance in distinguishing among noteworthy events and events that can be safely ignored. Further, the great number of the reports prevents meaningful engagement with them; they effectively constitute noise in recipients' Email inboxes. Further, the generation, dissemination, and recipient-processing of a large number of operation-level reports of low value wastes system resources, including compute, memory, and communication resources, e.g., because each such report requires a prescribed amount of resources to produce, transmit, and store.

The above-summarized technology is capable of being manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF DRAWINGS

FIG. 2 shows a control plane associated with the network-accessible computing platform of FIG. 1.

FIG. 10 is a flowchart that provides an overview of one manner of operation of the computing system of FIG. 1.

FIG. 11 is a flowchart that provides an overview of another manner of operation of the computing system of FIG. 1.

FIG. 12 is a flowchart that shows one approach to interacting with a language model in the process of FIG. 10.

FIG. 13 shows computing equipment that, in some implementations, is used to implement the computing system of FIG. 1.

The same numbers are used throughout the disclosure and figures to reference like components and features.

DETAILED DESCRIPTION

Figure 1:
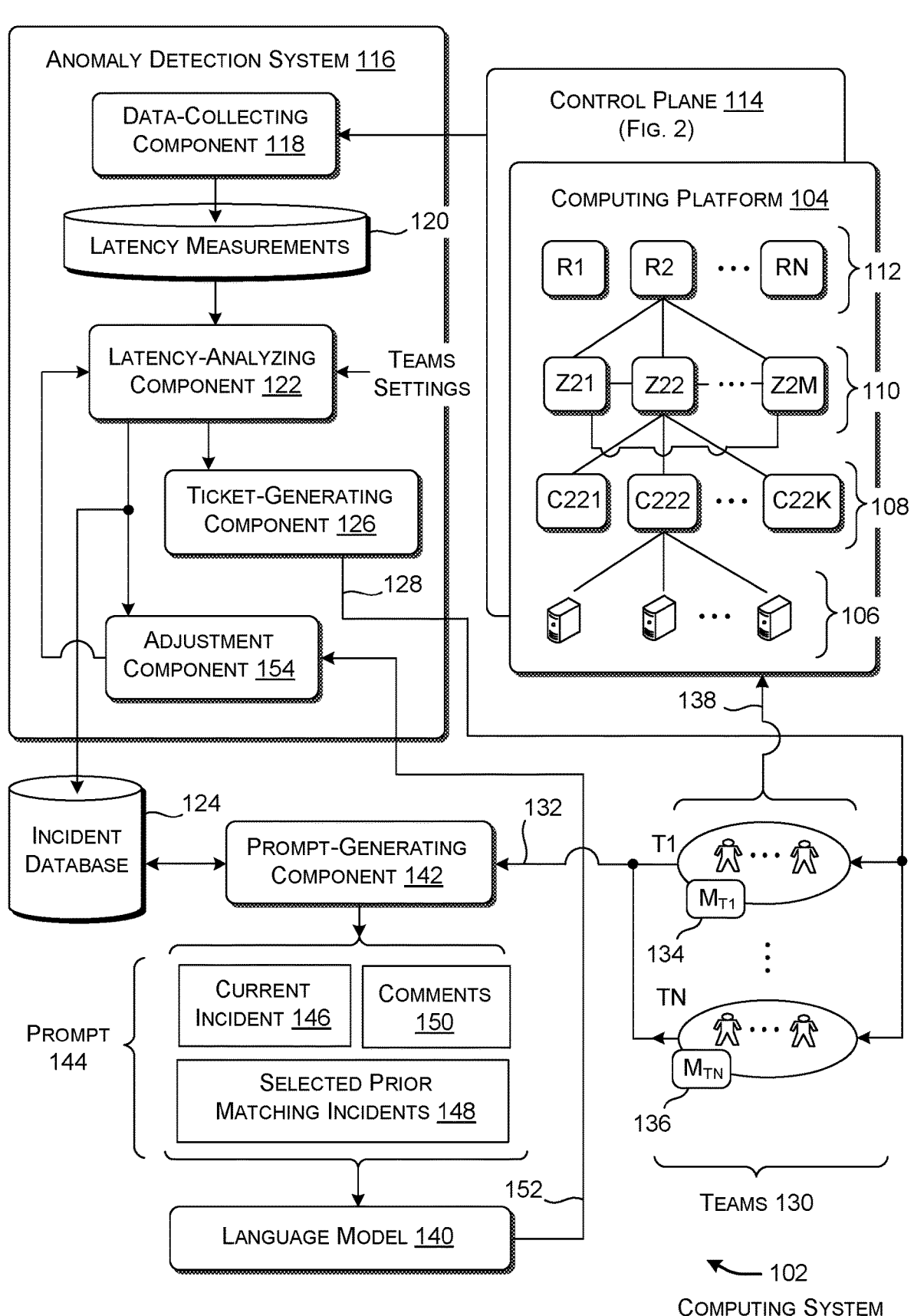
FIG. 1 shows a computing system for detecting anomalies that occur when a network-accessible computing platform performs provisioning actions.

FIG. 1 shows a computing system 102 for detecting anomalies that occur when a network-accessible computing platform 104 ("computing platform" henceforth) performs provisioning actions. The network-accessible computing platform 104, for example, encompasses those types of systems referred in the industry as cloud computing platforms, examples of which include the AZURE platform provided by MICROSOFT COPRORATION of Redmond, Washington, and the AWS platform provided by AMAZON-.COM, Inc. of Seattle, Washington. The provisioning actions include creating resources, updating resources, and deleting resources. One way to update the resources is by changing their status from active to deallocated; deallocated resources are resources that have been temporarily disabled and released, but are held in reserve for later activation and not deleted. Deleted resources are removed (released) and longer held in reserve for later activation. The resources includes virtual machines, sets of virtual machines, containers, network-related resources (e.g., network interface controllers), storage resources, etc.

In some implementations, the physical resources of the computing platform 104 are distributed over a geographical area in a hierarchical manner. In one example, a collection of physical resources 106 (servers, storage devices, network interface controllers, etc.) are housed in a particular data center (e.g., C222), which is one of a plurality of data centers 108 associated with a particular availability zone (e.g., Z22). The particular availability zone, in turn, is one of a plurality of availability zones 110 of a particular region (e.g., R2). The particular region, in turn, is one of a plurality of regions 112.

By way of terminology, the word "particular" is a used herein to designate one member of a class of items; its usage does not suggest that the member has properties which distinguish it from the other members of the class, unless otherwise noted. Further, the term "prescribed" is used to designate that something is purposely chosen according to any application-specific considerations. For instance, a threshold value or state is said to be prescribed insofar as it is purposely chosen to achieve a desired result. "Application-specific" means that a state is chosen for use in a particular application. Further, in some contexts, terms such as "component," "module," "engine," and "tool" refer to parts of computer-based technology that perform respective functions.

In operation, a local instance of a resource manager (not shown) receives a provisioning request. The computing platform 104 handles the request in a top-down manner, e.g., by routing it to a particular region, and then to a particular availability zone, and then to a particular data center, and then to particular resources in the data center. Note that the computing platform 104 also accommodates communication between nodes of any layer. For example, FIG. 1 indicates that high-speed links exist between the data centers of the different availability zones 110. The physical architecture of the computing platform 104 shown in FIG. 1 is to be understood as illustrative; the principles set forth here apply to any type of computing platform having a distributed collection of physical resources.

The functions of the computing platform 104 are commonly represented as pertaining to either a control plane 114 or a data plane (not shown). The control plane 114 hosts all functions associated with creating, updating, and deleting resources in the computing platform 104. The data plane refers to actual transactions performed by the computing platform 104 that use the resources that have been allocated for this purpose by the control plane 114. For example, the control plane 114 handles the task of creating a virtual machine. The data plane handles the task of actually using the virtual machine to run a client entity's application.

As will be clarified below with respect to the explanation of FIG. 2, the control plane 114 has a plurality of control nodes which mirror the physical organization of resources in the computing platform 104. Further, each control node in the control plane 114 is associated with a particular provisioning service performed by the control plane 114. Each service, in turn, performs one or more executable operations. In one example, the control plane 114 hosts a few dozen services (e.g., 40 services), and the control plane 114 supports a few thousand executable operations (e.g., 4,000 executable operations).

Any provisioning action is defined by plural attributes, including any of: a type of provisioning work that is being requested (including the creation, updating, deallocation, deletion, etc. of virtual machine functionality); the region in which the action is to take place (such as Eastern United States), which is one of the regions 112 of the computing platform 104; the type of operating system used by the resource WINDOWS operating system, provided by MICROSOFT CORPORATION, or an Ubuntu operating system, provided by LINUX FOUNDATION of San Francisco, California); the type of virtual machine, e.g., as specified by its SKU code (Ds2v4, ND96v4, etc.); a particular customer, and so on. Any given provisioning action invokes a particular set of services to perform its functions.

An anomaly detection system 116 detects latency-related anomalies in the operation of the control plane 114. An "anomaly," as the term is used herein, refers to an event that deviates from a norm, as established by any application-specific rule. "Latency" refers to the amount of time that is taken to perform a particular provisioning action, such as creating a virtual machine, updating the virtual machine, or deleting the virtual machine. Accordingly, the purpose of the anomaly detection system 116 is to detect when any provisioning action takes an amount of time that exceeds an established norm, as established by rules. An "incident" refers to an anomalous latency-related event detected by the anomaly detection system 116.

In some implementations, the anomaly detection system 116 includes a data-collecting component 118 that receives a stream of latency measurements as the control plane 114 handles provisioning requests. In particular, each control node of the control plane 114 sends the data-collecting components 118 one or more latency measurements that express the amounts of time it has taken to perform a provisioning function. For instance, a latency measurement associated with an executable operation expresses the amount of time that has been spent performing the executable operation. A latency measurement associated with an entire service expresses the amount of time that has been spent performing the service. Synonyms for the term "latency measurement" include "latency," "amount of time," and "time value." Generally, for information X to express characteristic Y means that that characteristic Y is directly or indirectly conveyed or contained in the information X.

The data-collecting component 118 receives the latency measurements via a push-based protocol (in which the control plane 114 independently sends the latency measurements to the data-collecting component 118), a pull-based protocol (in which the data-collecting component 118 polls the control plane 114 for any new latency measurements), or a combination thereof. The data-collecting component 118 stores the latency measurements in a data store 120.

In some implementations, the data-collecting component 118 collects latency measurements for a plurality of different provisioning actions that are of interest. More specifically, in one example, the data-collecting component 118 ensures that, during the course of a day or other sampling period, it has collected latency measurements for a prescribed number of executions of provisioning action A, a prescribed number of executions of provisioning action B, a prescribed number of executions of provisioning action C, and so on. In some implementations, the data-collecting component 118 performs this data collection operation by picking out a required number of samples from the data store 120. Alternatively, or in addition, the data-collecting component 118 actively requests the control plane 114 to provide latency measurements for specific provisioning actions. Alternatively, or in addition, the anomaly detections system 116 submits requests pertaining to different provisioning action of the control plane 114. Latency measurements procured in this manner are referred to as synthetic measurements, since they originate from requests generated for a testing purpose. Generally, any of the latency measurements in the data store 120 are to be understood as originating from any mixture of synthetic requests and/or actual customer requests.

A latency-analyzing component 122 analyzes the latency measurements in the data store 120 to determine whether they exhibit any anomalous latency-related events. As will be explained in detail below, the latency-analyzing component 122 operates by generating latency profile information, which includes different instances of distribution information. Each instance of distribution information characterizes a distribution of latency measurements pertaining to a single provisioning action for a particular frame of reference. For example, end-to-end (E2E) distribution information describes a distribution of the amounts of time it has taken to perform an entire provisioning request (associated with a particular provisioning action) within the course of a day or other sampling period. Service-level distribution information describes a distribution of the amounts of time it has taken to perform a particular service within a provisioning action over the course of the sampling period. Operation-level latency-profile reflects the amounts of time it has taken to perform an individual executable operation within a service over the sampling period, and so on. In some implementations, as will be described in detailed below, the latency-analyzing component 122 detects a potential latency-related anomaly based on a combination of the E2E-level distribution information and service-level distribution information for a particular service. Variations in the operation of the latency-analyzing component 122 are also described below.

In some implementations, an instance of distribution information characterizes a distribution using Pxx values. Each Pxx value expresses a latency L associated with a particular percentage P; this means that P percent of latencies over a sampling period (e.g., one day) have latencies less than L. For example, consider a latency of 350 ms at 99.9 percent. This means that 99.9 of the latencies within the sampling period having latencies less than 350 ms. The latency-analyzing component 122 repeats the above-described analysis for each successive day, to overall reveal a historical trend in latency-related performance. Other implementations use other statistical measures to express the shape of a distribution of latencies.

A data store 124 stores information regarding any incident detected by the latency-analyzing component 122. This information includes any of the raw latency measurements pertaining to the incident, the latency profile information associated with the incident, the metadata associated with the incident, and so on. The data store 124 is implemented by any type data structure in any type of storage device, examples of which are provided below with reference to FIG. 14.

A ticket-generating component 126 produces a report that describes an incident detected by the latency-analyzing component 122. In some implementations, the report describes the latency-related performance of a particular service that contributed to an incident, with respect to a particular provisioning action. The particular service is associated with a particular version, a particular node in the control plane 114, and a particular geographic location. The report provides service-level distribution information that characterizes the distribution of latencies associated with this service. The report also provides links to metadata and operation-level latency-related distribution information pertaining to the particular service. An entity and/or automated analysis engine selectively accesses this information on an as-needed basis to assist in the analysis and diagnosis of the incident. The report also optionally provides end-to-end distribution information pertaining to the execution of the particular provisioning action in its entirety.

As will be described below in greater detail, detecting and reporting poor performance on a service-level granularity is particularly useful because it avoids sending a large number of noisy reports pertaining to operation-level anomalies. In other words, detecting and reporting poor performance on a service-level granularity acts as a filter or throttle that reduces the amount of information sent to recipients of the reports. This has the effect of reducing the consumption of resources (compute resources, memory resources, communication resources, etc.), compared to the case of detecting and reporting poor performance on an operation-level of detail. Further, detecting and reporting poor performance on a service-level granularity more effectively identifies issues in the computing platform 104 that warrant action, compared to noisy operation-level detection and reporting. In particular, operation-level detection and reporting identifies a large quantity of transient operation-level incidents that do not warrant action (e.g., because they do not meaningfully contribute to the overall poor performance in the computing platform 104 as experienced). Further, detecting and reporting poor performance on a service level of granularity reduces clutter in the Email boxes of recipients, which increases the chances that recipients will meaningfully engage with the reports.

As represented by a path 128, the ticket-generating component 126 distributes the report to an entity (or entities) within an organization that is best able to interpret and respond to the report. For example, some organizations include teams 130 of engineers or other individuals associated with different control nodes of the control plane 114. These teams 130 are tasked with the responsibility of maintaining their assigned control nodes. In that kind of environment, the ticket-generating component 126 sends the report to the team associated with the service identified by the report.

As represented by a path 132, the computing system 102 receives at least one comment pertaining to the incident. For example, in some cases, the comment specifies a suspected cause of the incident. Alternatively, or in addition, the comment specifies a recommended action to be taken in response to the incident. Alternatively, the comment specifies that no action needs be taken regarding the incident. Any comment also optionally specifies the reasons which underlie its conclusion. In some implementations, a human team member manually provides the comments. In other implementations, two or more team members supply comments.

Alternatively, or in addition, the computing system 102 relies on one or more automated engines to automatically supply comments, diagnoses, and recommendations for corrective action to be taken. Examples of automated engines included machine-trained language models, rules-based engines, lookup tables, and search engines. A language model auto-regressively generates text that provides a diagnosis and/or corrective action to be taken, given a prompt that describes the incident. This kind of language model represents a general-purpose language model that is given a suitable system prompt that describes the task it is expected to perform. In other implementations, this kind of language model is fine-tuned based on a corpus of training examples that specify appropriate diagnoses and corrective action to be taken for different reported incidents. A lookup table or rules-based engine maps information regarding the incident to a pre-generated diagnosis and/or a specification of corrective action to be taken. A search engine performs a search for an appropriate pre-generated diagnosis and/or corrective action to be taken, given a search query that describes the incident. The search engine performs such a search using any search technology, such as a vector-based lookup operation (described further below). FIG. 1 generally shows that a team T1 optionally makes use of at least one automated engine 134, and that a team TN optionally makes use of another automated engine 136. Each team's automated engine is customized to produce comments/diagnoses pertinent to the service to which the team is assigned. Alternatively, the automated engines (134, 136) represent different instances of a single automated engine.

As represented by path 138, the computing platform 104 (and associated control plane 114) receives an instruction from a team (or the team's automated engine) that specifies corrective action to be taken within the computing platform 104. For example, assume that a manual or automated diagnosis is made that an incident pertaining to a particular service is attributed to a faulty disk. A manually-generated or automatically-generated instruction in this case includes commands to replace the faulty disk. Other control actions specify changes in control settings, changes to program code, instructions to perform certain configuration actions, and so on. In some examples, path 138 represents the actions of: identifying a corrective action to be performed by a particular control node in the control plane 114 (in which this corrective action and associated control node are identified by a language model, lookup table, IF-THEN rule, search engine operation, etc.); sending an instruction to the identified control node to perform this corrective action; and receiving confirmation that the corrective action has been performed. This mode of operation constitutes an automated or semi-automated control process that has the ultimate effect of quickly and efficiently remedying substandard performance in the computing platform 104.

In some implementations, the computing system 102 performs the additional function of assessing whether or not a reported incident is a false positive. A false positive is a reported incident that does not require action. In some cases, an incident does not warrant action because no anomaly has, in fact, occurred. This error originates from the misinterpretation of the latency measurements, the existence of faulty measurements, etc. In other cases, an actual anomaly has occurred, but is assessed as transient or otherwise ignorable. Each environment provides rules that establish what kinds of anomalies are deemed worthy of servicing, and which anomalies can be effectively ignored. A true positive is an incident that is deemed worthy of action.

FIG. 1 shows an example in which the computing system 102 relies on a machine-trained language model ("language model") 140 to classify an incident as a true or false positive. The following terminology is relevant to some examples presented below. A "machine-trained model" or "model" refers to computer-implemented logic for executing a task using machine-trained weights that are produced in a training operation. A "weight" refers to any type of parameter value that is iteratively produced by the training operation. A "token" refers to a unit of information processed by a machine-trained model, such as a word or a part of a word. In some cases, a tokenizer produces the tokens, but an item (e.g., a text passage) is said to be composed of tokens in a general sense (in which "token" is a synonym of "part"), irrespective of when and where those tokens are actually produced. A "prompt" refers to a sequence of tokens submitted to a machine-trained model. An "embedding" is a distributed vector that represents an information item in a vector space. A "distributed vector," in turn, expresses the semantic content of an information item by distributing information over its k dimensions. A distributed vector is in contrast to a sparse one-hot vector that allocates particular dimensions of the vector to particular concepts.

A "language model" refers to a probabilistic model that processes tokens that express linguistic information (and/or other kinds of information). In the present context, the language model functions as a pattern completion engine. The pattern completion engine includes weights that reflect statistical patterns which have been learned by performing training on a typically large collection of training examples. In an auto-regressive mode of operation, given a set of input tokens, the pattern completion engine predicts a next token that is most likely to follow the input tokens. The pattern completion engine then adds the predicted token to the end of the input tokens, to produce an updated set of input tokens, and then repeats its analysis for the updated set of tokens. This process continues until the pattern completion engine predicts a stop token, which is a signal that the auto-regression operation should terminate. In some implementations, the language model 140 of FIG. 1 uses an attention mechanism to perform its predictions. The attention mechanism determines the relevance between pairs of tokens in the set of input tokens. Additional information regarding one illustrative implementation of the language model 140 is set forth below in connection with the explanation of FIG. 9.

A prompt-generating component 142 generates a prompt 144 pertaining to an incident under consideration, referred to below as a current incident. The prompt 144 includes a combination (e.g., a concatenation) of: any data pertaining to the current incident; any data pertaining to one or more prior incidents that are determined to match the current incident; and one or more comments pertaining to the current incident. The data store 124 provides the data regarding the current and prior incidents. As represented by path 132, the comments are received from the teams 130, and represent any combination of manually produced comments and automatically produced comments. FIG. 1 represents the different parts of the prompt 144 as a current incident 146, prior matching incidents 148, and comments 150.

An example of the prompt includes the following general instruction: "Description: The following is a log of an incident. Your task is to predict whether the incident is actionable, and generate a label which specifies 1 if the value is actionable and 0 if the value is non-actionable. You will be provided with examples to help you make your judgement. Your answer should be in JSON format, such as {'answer': 0, 'explanation': . . . }." The prompt 144 further includes the following more direct recitation of the task: "Task: predict the label (0 for non-actionable, and 1 for actionable) for the given incident log." The prompt 144 lists the top-matching three prior incidents as follows: "Examples: A incident log [insert incident log entry here] label: 0; B incident log [insert incident log entry here] label: 1; and C incident log [insert incident log entry here] label: 0." The prompt-generating component 142 supplies the data specified in the square brackets during its instantiation of the prompt 144, which it extracts from the data store 124. The prompt 144 terminates with a reinforcement of its desired output format: "Hint: Reminder to provide your answer in the form {'answer': 0, 'explanation': . . . }. Other implementations include additional information items in the prompt 144, and/or omit one or more information items specified above, and/or structure the information items in a different manner than specified above.

In some implementations, the prompt-generating component 142 finds the set of prior incidents that match the current incident by converting data pertaining to the current incident extracted from the data store 124 to a source vector (e.g., using a neural network, such as feed-forward neural network having any number of layers), corresponding to a distributed vector in a vector space. Assume that the data store 124 associates each prior incident with a target vector, corresponding to another distributed vector in the same vector space as the source vector. A background service (not shown) generates the target vectors as a background task using the same neural network that produces the source vector. The prompt-generating component 142 uses any distance metric, such as cosine similarity, to determine the distance between the source vector and any every target vector. In other implementations, the prompt-generating component 142 determines the distance between a particular source vector s and a particular target vector t by computing the L2 (Euclidean) distance (Distance(s, t)) between these two vectors, and then computing:

$$MatchScore(s, t) = \frac{1}{1 + \text{Distance}(s, t)} * e^{-\alpha|T(s)-T(t)|}. \tag{1}$$

In this equation, $\alpha$ is an application-specific parameter value, $T(s)$ represents the time of occurrence of the current incident, associated with the source vector s, and $T(t)$ represents the time of occurrence of a prior incident, associated with the target vector t. The timing information in Equation (1) generally has the effect of decreasing the significance of a match between s and t as the length of time between the occurrences of s and t grows larger.

To assist in this search, the prompt-generating component 142 relies on any vector traversal algorithm, such as the Approximate Nearest Neighbor (ANN) technique. The prompt-generating component 142 retrieves incident data for the K prior entries that are determined to most closely match the current incident, where K is an application-specific parameter. In some implementations, the prompt-generating component 142 applies the additional rule that a distance between the current incident and any prior incident must be within a prescribed application-specific threshold value.

The language model 140 auto-regressively produces label information 152 based on the prompt 144, that is, token by token. As stated, the label information indicates whether the current incident corresponds to a true or false positive, e.g. by specifying values of 1 and 0, respectively. In other implementations, the language model 140 is implemented as neural network that maps the tokens in the prompt 144 to the label information 152 in non-auto-regressive fashion. An example of this type of language model is a BERT-based transformer model, described below in further detail with reference to FIG. 9. This type of application omits generation of an explanation, as is provided by the auto-regenerative mode of operation.

Illustrative label information 152 produced by the language model 152 includes the text: "{'answer': 0, 'explanation': 'The incident log describes a transient issue that has stopped occurring. The details suggest that the problem resolved itself without requiring additional action, making it nonactionable. The log provides sufficient information to support this conclusion, similar to the examples where the majority of them are nonactionable (0).'}."

In some implementations, an adjustment component 154 accumulates plural instances of label information. Based on this accumulated information, the adjustment component 154 adjusts one or more control settings of the latency-analyzing component 122. Such control settings generally affect the way that the latency-analyzing component 122 identifies and reports incidents associated with anomalous events. In one implementation, for example, the adjustment component 154 is a rule-based engine that applies an IF-THEN rule, lookup table entry, etc. that posits: if a percentage of incidents being labeled as false positive exceeds a prescribed threshold value, then raise (or lower) one or more thresholds in the latency-analyzing component 122 that govern the identification of anomalous incidents (to thereby make the detection of anomalies less likely). Alternatively, or in addition, the adjustment component 154 applies an IF-THEN rule, lookup table entry, etc. that posits: if a prescribed input condition is encountered (e.g., associated with a particular provisioning action and/or failure signature), then do not generate a report. In other implementations, the adjustment component 154 uses a machine-trained model of any type to map label information regarding the incidents to control settings. Illustrative language models that are capable of performing this task include various types of language models. In some implementations, the adjustment component 154 also takes account for direct feedback from the teams 130 in determining how to adjust the control settings. Generally, the adjustment component 154 and the language model 140 (which provides feedback to the adjustment component 154), work together to function as a filter or throttle or load controller that reduces the flow of reports to the teams when appropriate. This has the effect of increasing the salience of reports sent to the teams, making more efficient use of communication resources, reducing clutter in the inboxes of report recipients, and reducing the consumption of storage space for storing the reports. It also helps to quickly remedy inefficiencies in the computing platform 120 which impair the quality of service provided to clients.

Among other technical characteristics, the technique expedites the detection, diagnosis, and resolution of anomalies in the network-accessible computing platform 104. This reduces the use of system and human resources devoted to attending to malfunctioning equipment and software in the computing platform 104. This also improves the responsiveness of user interface presentations provided to end users, making the interfaces seem less sluggish. The timely resolution of the anomalies also has the net effect of reducing the amount of time required to perform provisional-related actions, such as setting up and deleting virtual machines.

Further, as previously stated, reporting on a service-level granularity via the service-level distribution information is useful because it avoids sending a large number of noisy reports pertaining to operation-level details. A voluminous amount of operation-level reports tends to create clutter in a recipient's inbox, which has the effect of overwhelming the recipient and consuming a large amount of networking, computing, and storage resources. That is, it requires a significant amount of resources to generate, transmit, and store these operation-level reports. Reporting on a service-level granularity reduces the volume of reports and/or the sizes of the reports, which has the effect of reducing the consumption of resources used to generate, transmit, and store the reports. Further, operation-level reports often fail to provide assistance in distinguishing among noteworthy events and events that can be safely ignored. This often renders these reports nonactionable. Reporting on a service-level granularity is more likely to produce relevant and actionable performance information, for consumption by the teams associated with the impacted service(s). At the same time, performing reporting on a service-level granularity is not so general in nature that it dilutes and obscures the sources of anomalous behavior. The anomaly detection system 116 also assists in diagnosis by offering operation-level detail on an as-needed basis.

Reporting at a service-level granularity via the service-level distribution information is particularly helpful in detecting anomalies associated with particular versions of services, associated with particular nodes of the control plane 114 and particular geographic locations. As a consequence thereof, the anomaly detection system 116 provides timely feedback on recent changes made to a particular part of the control plane 114. This has heretofore been a difficult task. The difficulty is due the complexity of the control plane 114, the great volume of measurements collected by the data-collecting component 118, and the distributed and fractured nature in which changes are made across the control plane 114. "Fractured" means that different teams 130 typically add new and modified services independently of each other and at different times. Further, the teams 130 typically introduce modifications to services in a staged manner, which adds further complexity to the control plane 114. All of this complexity leads to vast amounts of noisy operation-level data that obscures the true sources of latency-related anomalies. Reporting all of this data on an operation-level granularity consumes a significant amount of resources, without meaningfully guiding a report recipient as to the true cause of anomalous performance.

FIG. 2 shows one implementation of the control plane 114. The control plane 114 includes control nodes associated with the hierarchy of physical resources of the computing platform 104, as described above with reference to FIG. 1. A global level 202 encompasses one or more instances of geographically-dispersed resource management control nodes. A particular resource management control node uses resource management services 204 to interpret an input request and route the input request to an appropriate regional control node (e.g., based on a region specified in the request). A regional level 206 encompasses different regional control nodes associated with the different regions 112 shown in FIG. 1. A particular regional control node associated with a particular region uses regional-level services 208 to identify what resources need to be provisioned in response to the request, to manage the provisioning of the resources, and, in the process, to interact with one or more zonal control nodes.

A zonal level 210 encompasses zonal control nodes associated with different availability zones, such as the subset of availability zones 110 shown in FIG. 1. A particular zonal control node associated with a particular availability zone uses zonal-level services 212 to orchestrate the execution of the request (e.g., by determining how resources are to be distributed within the zonal level 210), and to forward appropriate instructions to one or more data center control nodes. A data center level 214 encompasses data center control nodes associated with different data centers, such as the subset of data centers 108 shown in FIG. 1. A particular data center control node uses the data center services 216 to select and manage the resources and actions that are appropriate to implement the request, e.g., by determining the choice and placement of resources within a data center.

A nodal level 218 is associated with a set of one or more physical or virtual machines and associated functionality, managed as a group. In some implementations, for instance, the nodal level 218 refers to a logical layer on top of a physical blade server (also known as a high-density server). The blade server includes one or more physical servers housed in a single chassis, and a root operating system. A particular nodal control node encompasses nodal-level services 220 for managing virtual machine functionality associated with a blade server. For example, the nodal-level services 220 include services for manipulating the resources of the blade server and its associated root operating system for the purpose of configuring containers and performing other nodal-level management tasks. A virtual machine (VM) level 222 encompasses virtual machine control nodes provided by each data center. A particular virtual machine control node includes VM services 224 for managing virtual machine functionality on an individual virtual machine level in a data center, e.g., associated with a set of container IDs. Viewing the hierarchy shown in FIG. 1 as a whole, each single virtual machine is implemented in one specific region, one specific availability zone, one specific data center, and one specific resource control node.

Some implementations of the control plane 114 also include cross-domain services 226. Cross-domain services involves interaction among two or more levels specified above, and therefore cannot be said to be part of any single level. One example of such a service is the PubSub service provided by MICROSOFT COPRORATION, which enables messaging in web applications.

Different implementations of the control plane 114 implement different types of functions. The following are illustrative functions provided by one environment: creating an individual virtual machine; deleting an individual virtual machine; starting a virtual machine that has been previously allocated; deallocating a virtual machine that has been previously started; attaching disks to an existing virtual machine; detaching disks from an existing virtual machine; creating a scale set of virtual machines; deleting a scale set of virtual machines using a particular mode of deletion; updating a scale set of virtual machines; attaching disks to a scale set of virtual machines; detaching disks from an existing scale set of virtual machines; creating a flex set of virtual machines; deleting a flex set of virtual machines; updating an existing flex set of virtual machines, and so on. A scale set of virtual machines is a set that is configured to automatically expand and contract with existing workload. A flex set of virtual machines is a scale set that allows a request to specify a preferred geographical distribution of resources.

As stated above, any service involves the execution of a set of executable operations. For example, consider a control node in the control plane 114 that performs a service pertaining to the provisioning of network-related resources. This service encompasses at least the following component executable operations: validating an input network profile associated with a virtual machine; querying tenant clusters for network allocation; allocating network resources associated with the virtual machine; validating network resource allocation completion; and committing the allocated network resource in a tenant.

More generally stated, the creation of a virtual machine, container, etc. can be regarded as a geographically distributed assembly line for constructing a physical product. Each step along the ways contributes to the production of the physical product. Some of the initial steps primarily involve functions of planning, selecting resources, and allocating resources. Allocation decisions are based on any combination of: the specifics of the request; available resources; resiliency considerations (which are promoted by geographically distributing resources); and load-balancing considerations. Later steps of the process entail the actual fabrication of the product, which occurs in individual data centers.

Along another dimension (aspect), the services associated with the control plane 114 are grouped into a storage control plane 228, a compute control plane 230, and a networking control plane 232. The storage control plane 228 handles the creation, updating, and deletion of storage resources. The compute control plane 230 handles the creation, updating, and deletion of compute resources. The networking control plane 232 handles the creation, updating, and deletion of network-related resources, such as network interface controllers (NICs). To provide one example, a particular regional control node encompasses storage resource provider services (associated with the storage control plane 228) that manage storage-related provisioning tasks, compute resource provider services (associated with the compute control plane 230) that manage compute-related provisioning tasks, and network resource provider services (associated with the networking control plane 232) that manage network-related provisioning tasks.

Other implementations of the control plane 114 include additional features not described above, and/or omit one or more features described above, and/or organize features in a different manner compared to that specified above. More generally, the principles set forth herein are agnostic to the particular architecture and services offered by any computing platform. In other words, insofar as the anomaly detection system 116 is able to access latency measurements produced by the control plane 114 on a fine-grained basis, it is able to detect anomalies in the executable operation of the control plane 114.

Figure 3:
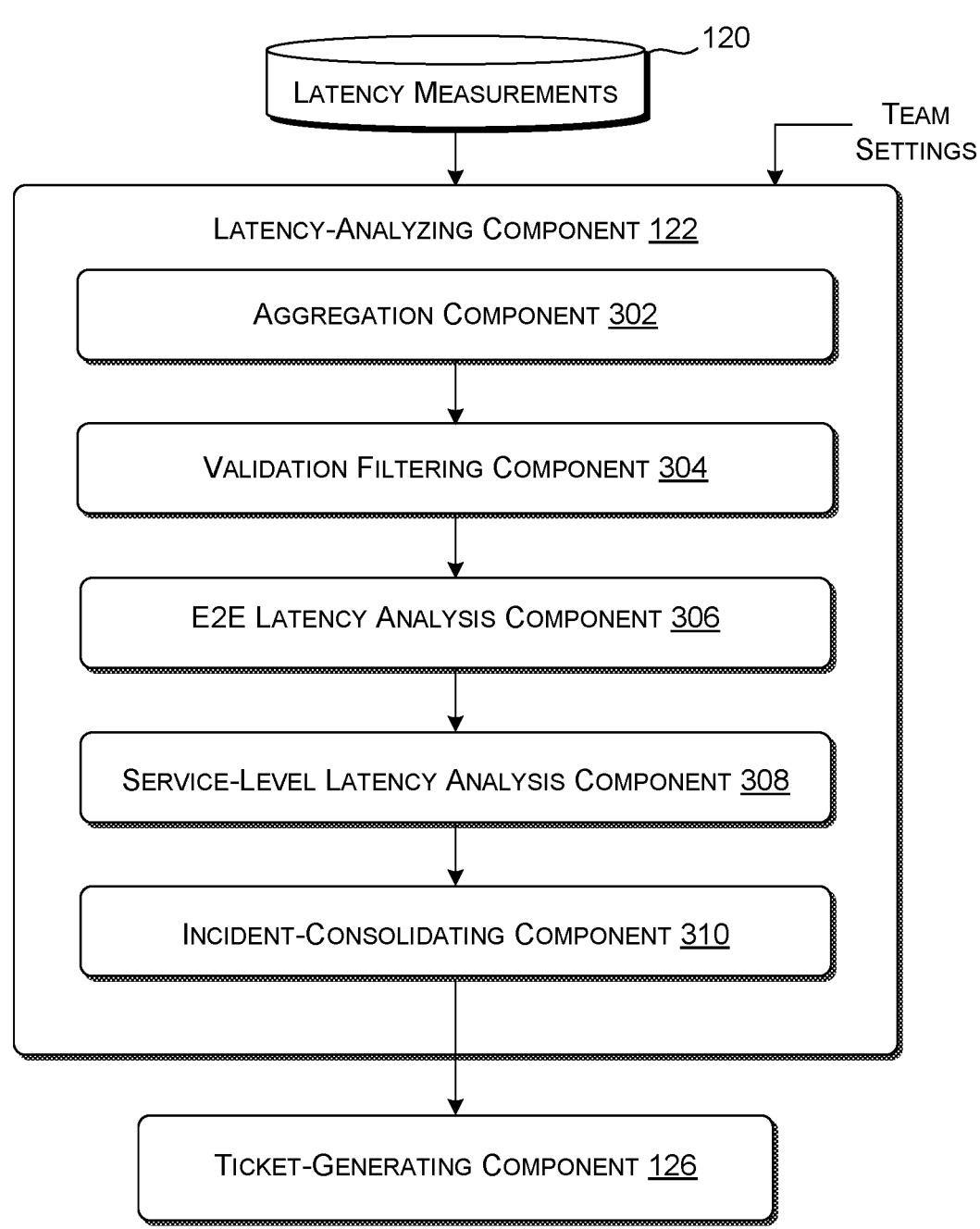
FIG. 3 shows an implementation of a latency-analyzing component, which is one component of the computing system of FIG. 1.

FIG. 3 shows one implementation of the latency-analyzing component 126. The latency-analyzing component 126 will be described below in the illustrative context of a particular provisioning action, corresponding to a request to create 3,000 virtual machines of a particular type over the course of a day (or any other specified sampling period) in a particular region of the world (e.g., Eastern United States). An aggregation component 302 identifies a subset of measurements for analysis associated with the particular provisioning action. For example, the aggregation component 302 identifies a subset of latency measurements produced by the different control nodes of the control plane 114 while carrying out the request to create 3,000 virtual machines over the course of the day. Note that the aggregation component 302 performs this same operation for successive sampling periods (e.g., successive days). A validation filtering component 304 determines whether the group of latency measurements satisfies determined rules. For example, the validation filtering component 304 determines whether a threshold number of virtual machines has been created for a current day under consideration, and whether there is a threshold number of successive days for analysis (inclusive of the current day); if not, the validation filtering component 304 aborts the remainder of its analysis functions for this provisioning action on this day. This is because the latency-analyzing component 122 makes decisions based on the statistical distribution of latencies over the sampling period; a small number of samples renders the assessments unreliable.

An end-to-end (E2E) latency analysis component 306 generates an E2E-level distribution information for end-to-end latencies over the sampling period. An E2E latency expresses the amount of time it has taken to perform one instance of the task, such as creating an individual virtual machine. The E2E latency analysis component 306 determines whether there are any deviations in the E2E-level distribution information that satisfy a predetermined test. One test involves determining whether a spike in latency exceeds a prescribed absolute threshold value. In addition, or alternatively, one test involves determining whether a spike in latency exceeds a relative threshold value, meaning that it is higher than neighboring latencies by more than a prescribed amount. In addition, or alternatively, one test involves determining whether a spike in latency exceeds a specified absolute and/or relative threshold value, and also has a duration or frequency of occurrence above a prescribed threshold value. For example, this rule specifies that a spike is anomalous if it lasts a prescribed number of days (inclusive of a current day), or is present in a prescribed number J of the last D days (inclusive of the current day), where J and D are application-specific values, or satisfies any other combination of duration and frequency. Other implementations apply additional rules and/or omit one or more rules specified above.

A service-level latency analysis component 308 performs service-level analysis for the services invoked in performing the request. In doing so, the service-level latency analysis component 308 makes reference to one or more instances of service-level distribution information for corresponding services. A particular instance of service-level distribution information characterizes the distribution of latencies associated with a particular service over a sampling period.

More specifically, assume that the E2E-level distribution information (produced by the E2E latency analysis component 306) exhibits a spike that satisfies the test for being anomalous. Assume that this spike occurs at a particular percentage value Z associated with the E2E-level distribution information (where the meaning of this percentage value Z will be clarified below). The service-level latency analysis component 308 first ranks the services by their latencies, from shortest to longest, and identifies the top N (e.g., 5) services with the longest latencies. The service-level latency analysis component 308 determines the latency of a service using any metric or metrics, including any characteristic identified from the service-level distribution information associated with the service (e.g., the maximum latency over the sampling period, the maximum latency over the sampling period having a prescribed duration (inclusive of the current day), the latency in the service-level distribution information at the particular value Z, the average latency in the service-level distribution information at the particular value Z over a prescribed duration (inclusive of the current day), the average latency over the sampling period, and so on). Starting with the service having the worst (longest) latency, the service-level latency analysis component 308 examines its service-level distribution information to determine whether it exhibits an anomalous deviation of a prescribed magnitude at the same percentile Z identified in the E2E-level distribution information (produced by the E2E latency analysis component 306). If so, the service-level analyzing component 122 concludes that a reportable incident has occurred. In some implementations, the service-level analysis component 308 repeats this analysis for the remainder of the top-ranked services.

An incident-consolidating component 310 consolidates any two or more separate instances that are associated with a suspected common source of failure. The incident-consolidating component 310 performs this task on a service-level granularity. For example, assume that the same service appears to be playing a role in anomalous events encountered in two or more different provisioning actions. More specifically, assume that a particular service ABC is a contributing factor in anomalies encountered in processing a request to create virtual machines in the Eastern United States and a request to create the same type of virtual machines in the Western United States. The incident-consolidating component 310 groups these two incidents into a single reportable event (to be conveyed in a single report). In another case, the incident-consolidating component 310 determines that two or more services play a role in anomalous events encountered when handling a single provisioning action. In response, the incident-consolidating component 310 groups these incidents together into a single reportable event. Generally, each environment uses an application-specific set of rules to govern the circumstances in which it combines two or more incidents into a single reportable event. Consolidation is generally beneficial to reduce the volume of alerts sent to a recipient, which has the effect reducing the consumption of networking, computing, and storage resources, and improving the level of engagement by the recipient with the generated reports.

FIG. 3 shows that the latency-analyzing component 122 optionally receives configuration information from the teams 130. An instance of configuration information specifies particular rules and settings to be used when identifying incidents that are destined for a particular team. For example, an instance of configuration information specifies any of: the threshold magnitude of a latency spike (in order for it to qualify as anomalous); the threshold duration of the latency spike (in order for it to qualify as anomalous); grouping rules to be applied by the incident-consolidating component 310, and so on. Performing detection and reporting on a service-level granularity facilitates the task of configuring the latency-analyzing component 122; this is because service-level detection and reporting operates on a more encompassing level than operation-level detection and reporting, and is thus specifiable in fewer configuration parameters compared to operation-level detection and reporting.

Other implementations vary the above-described process of analysis in one or more respects. For example, another implementation first identifies potentially problematic services based on their instances of service-level distribution information, and then consults the E2E distribution information for confirmation. Another implementation performs reporting on service-level distribution information without confirmation from end-to-end distribution information.

Figure 4:
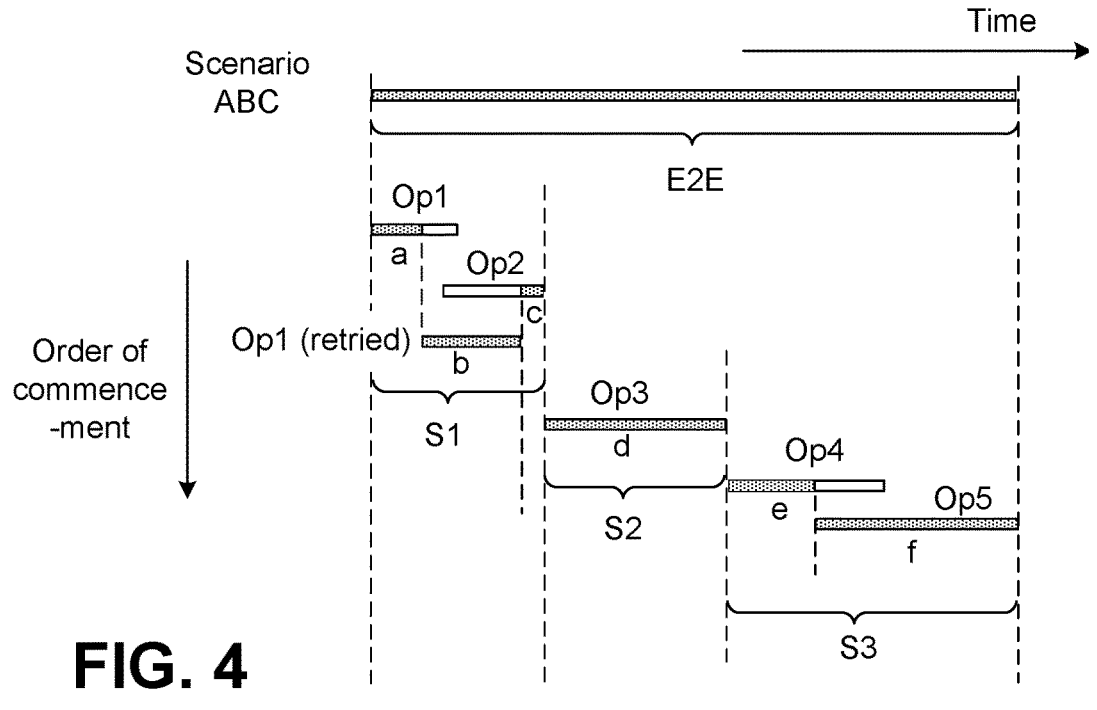
FIG. 4 shows latencies that are measured in the course of performing a particular provisioning action.

FIG. 4 shows different levels of analysis that play a part in the operation of the latency-analysis component 122, associated with the execution of a particular provisioning task, denoted as provisioning action ABC. An end-to-end (E2E) latency expresses an amount of time it takes to perform the complete request, from a first-performed action to a last-performed action. An operation-level latency identifies the amount of time that is required to perform each instance of each individual executable operation, such as executable operation Op1. Assume that the control plane 114 required two attempts at the first executable operation to successfully complete it (e.g., because the first attempt failed). A consolidated operation-level latency specifies the amount of time that is required to perform all instances of such an executable operation, from a first-performed action in an attempt at the executable operation to a last-performed action in the attempt at the executable operation. A service-level latency specifies the amount of time that is required to perform a particular service, from a first-performed action of the service to a last-performed action of the service.

Different implementations compute the above-described latency times in different respective ways. In one approach, the latency-analyzing component 122 computes the exclusive amount of time spent in performing each executable operation in each service. The exclusive amount of time in performing an executable operation is an amount of time which excludes overlaps in time with one or more contemporaneously-performed executable operations. For example, the exclusive amount of time associated with first the first executable operation (Op1) in FIG. 1 is the summation of segments a and b, respectively associated with a first and second attempts at Op1. The portion of the first attempt at Op1 which overlaps the second attempt at Op1 is excluded. The exclusive amount of time for the second executable operation (Op2) is defined by segment c (because the preceding segment of Op2 overlaps the prior-commenced Op1). The exclusive amount of time for the third executable operation (Op3), which includes no overlapping executable operations, is defined by segment d. The exclusive amount of time for performing the fourth executable operation (Op4) is defined by segment e (because the remaining part of this executable operation overlaps with Op5). The exclusive amount of time for performing the fifth executable operation (Op5) is defined by the segment f. There is no later-commenced executable operation which overlaps with segment f, so segment f spans the entire length of executable operation Op5.

In some implementations, the latency of a service is a critical path latency defined by the summation of the exclusive times of each of its executable operations. In other words, an individual latency associated with a particular service is a summation of non-overlapping portions of latencies of the particular executable operations. For example, the critical path latency of the first service S1 in FIG. 4 is defined as the summation of segments a, b, and c. The critical path latency of the second service S2 is defined by the segment d. The critical path latency of the third service S3 is defined by the summation of segments e and f. In any critical path latency, periods of time at which two or more actions are concurrently performed are only counted once.

In some implementations, an instance of main program code implements a service. That main program code calls one or more subroutines to perform individual executable operations within the service. Here, the exclusive amount of time performed by the main program code is the amount of time spent within the body of the main program code itself, excluding the amount of time that is spent in any called subroutine. An inclusive amount of time associated with the main program code is the total amount of time spent in the main program code and any time spent in called subroutine(s). The same analysis described above extends to individual executable operations. For example, assume that an individual executable operation calls one or more subroutines. The exclusive amount of time spent in an executable operation is the amount of time spent within the main code of the executable operation, excluding the amount of time spent in any called subroutine. The inclusive amount of time spent in an executable operation is the total amount of time spent within the executable operation, including the amount of time spent within any called subroutines. In some implementations, the ticket-generating component 126 provides information regarding both exclusive and inclusive times. Further, in calculating a particular instance of exclusive time, any level of nested functions can be considered (e.g., just a first level or all levels).

Different implementations use different functionality to compute the above-described latencies. In some implementations, a Gantt-based profiler engine constructs an execution graph each time a provisioning request is executed. The execution graph specifies: the services and executable operations involved in executing the request; the dependencies among the different services and executable operations; and the amounts of time taken to execute the services and executable operations. In some implementations, the Gantt-based profiler engine calculates all or some of the latency measures described above.

Figure 5:
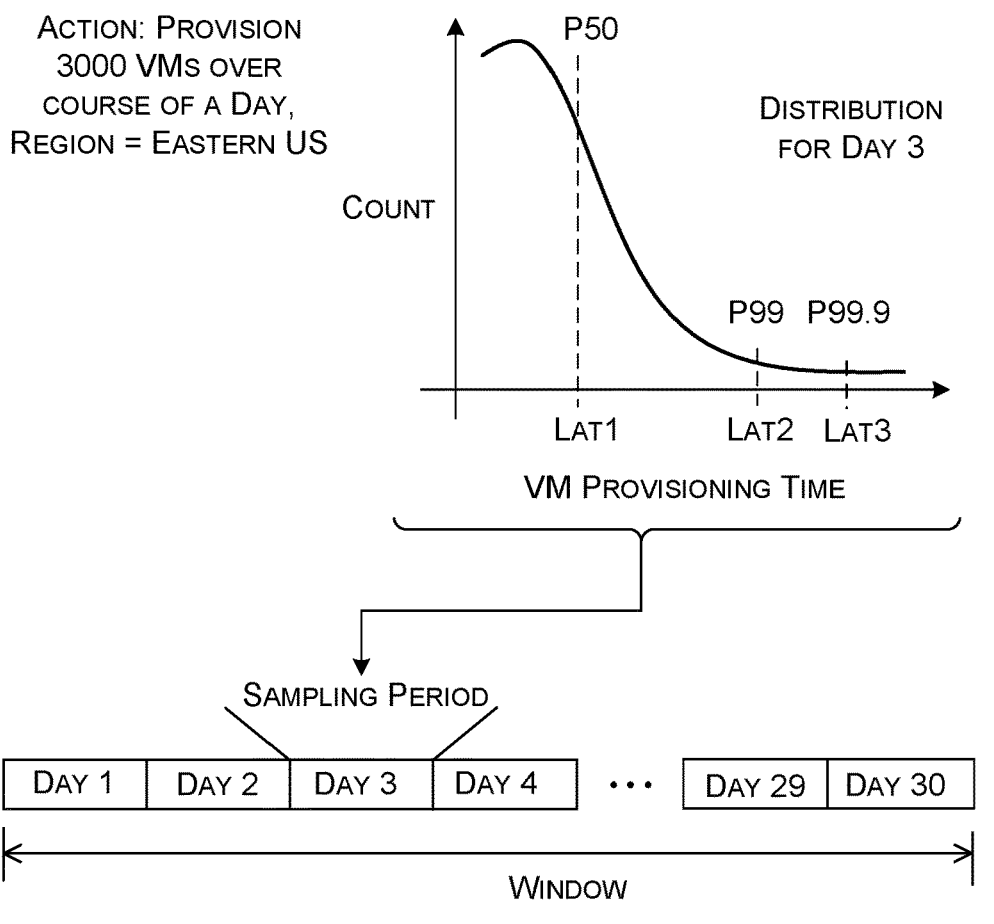
FIG. 5 shows a latency profile information that characterizes a distribution of latencies over a prescribed period of time, such as a day.

FIG. 5 shows an instance of distribution information associated with a set of latencies within a sampling period, here corresponding to the third day of a thirty-day window. The horizontal axis of the distribution information specifies the latency measurements for the third day, arranged from smallest to largest. The vertical axis expresses, for each latency, the number of latency measurements that share this latency. The distribution information also marks a predetermined subset of percentiles on the distribution curve, which are placed at associated latencies. Each percentile, associated with a particular latency, indicates that a prescribed percentage of latency measurements in the third day have latencies smaller than the particular latency. For example, the 50 percentile, and its associated latency Lat1, indicates that 50 percent of the latency measurements have a latency smaller than Lat1. The 99 percentile, and its associated latency Lat2, indicates that 99 percent of the latency measurements have a latency smaller than Lat2. The 99.9 percentile, and its associated latency Lat3, indicates that 99.9 percent of the latency measurements have a latency smaller than Lat3, and so on. Different implementations are configured to sample any number of such latencies, e.g., ranging from 50 percent to 99.9 percent.

Figure 6:
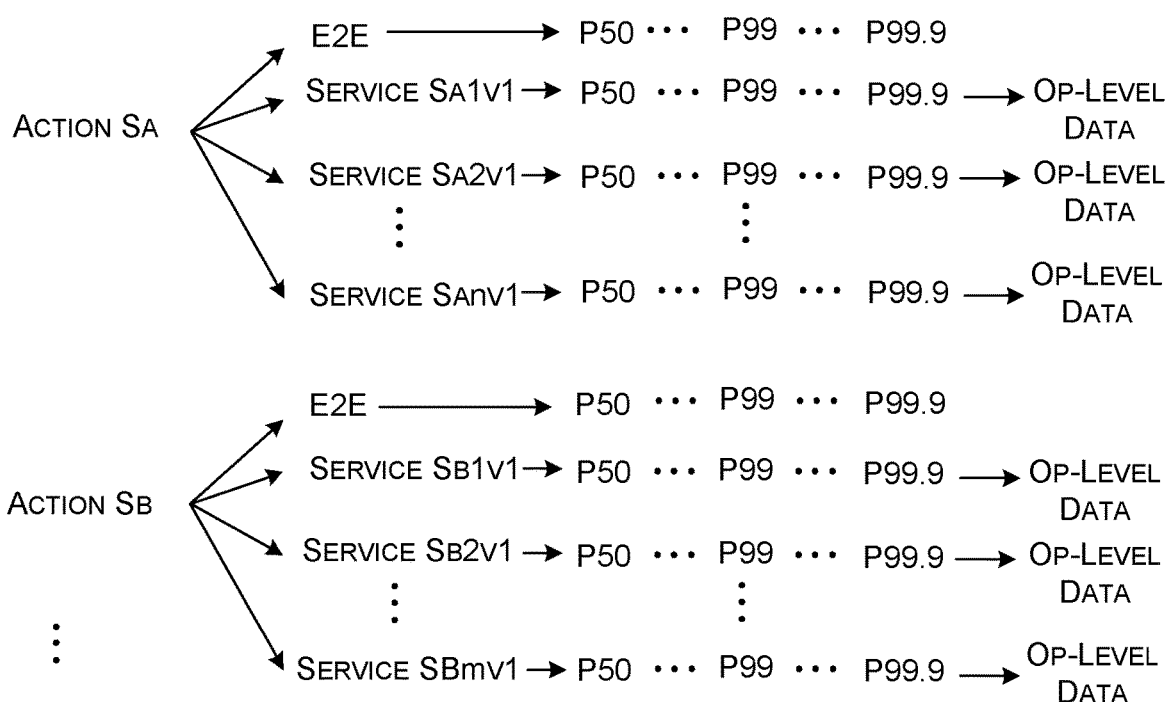
FIG. 6 shows latency-profile information produced for different provisioning actions over the course of a sampling period.

FIG. 6 shows a sample of distribution information collected for a particular sampling period, such as the third day shown in FIG. 5. Generally, the latency-analyzing component 122 generates latency-profile information for different provisioning actions, including provisioning action Sa and provisioning action Sb. For each such provisioning action, the latency-analysis component 122 generates distribution information that characterize any of: end-to-end times (measuring the amounts of time that are taken to perform the entire request); service-level times (measuring the amounts of time that are taken to perform each service in each provisioning action); and operation-level times (measuring the amounts of time that are taken to perform each executable operation within each individual service). In some implementations, the latency-analyzing component 122 measures performance for different levels of analysis (E2E, service, etc.) for at least the percentages of 50%, 99%, and 99.9%.

Figure 7:
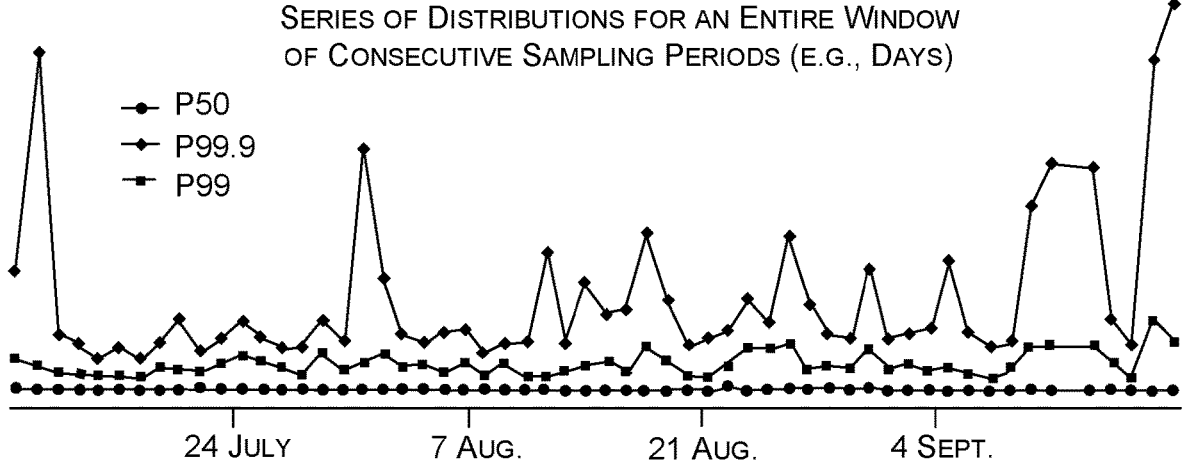
FIG. 7 shows a distribution of latency-profile information over a series of days.

FIG. 7 shows a series of instances of distribution information for an entire window of time, encompassing multiple sampling periods. For example, the distribution expresses latencies at the percentiles of 50 percent, 99 percent, and 99.9 percent, in this particular example, for end-to-end latencies. That is, each latency value expressed in FIG. 7 represents the type of information generated above with respect to the explanation of FIG. 5 for a particular day and associated with a particular sampling period and an associated instance of distribution information for that sampling period. The distribution shown in FIG. 7 reveals historical trends in latency-related performance.

Figure 8:
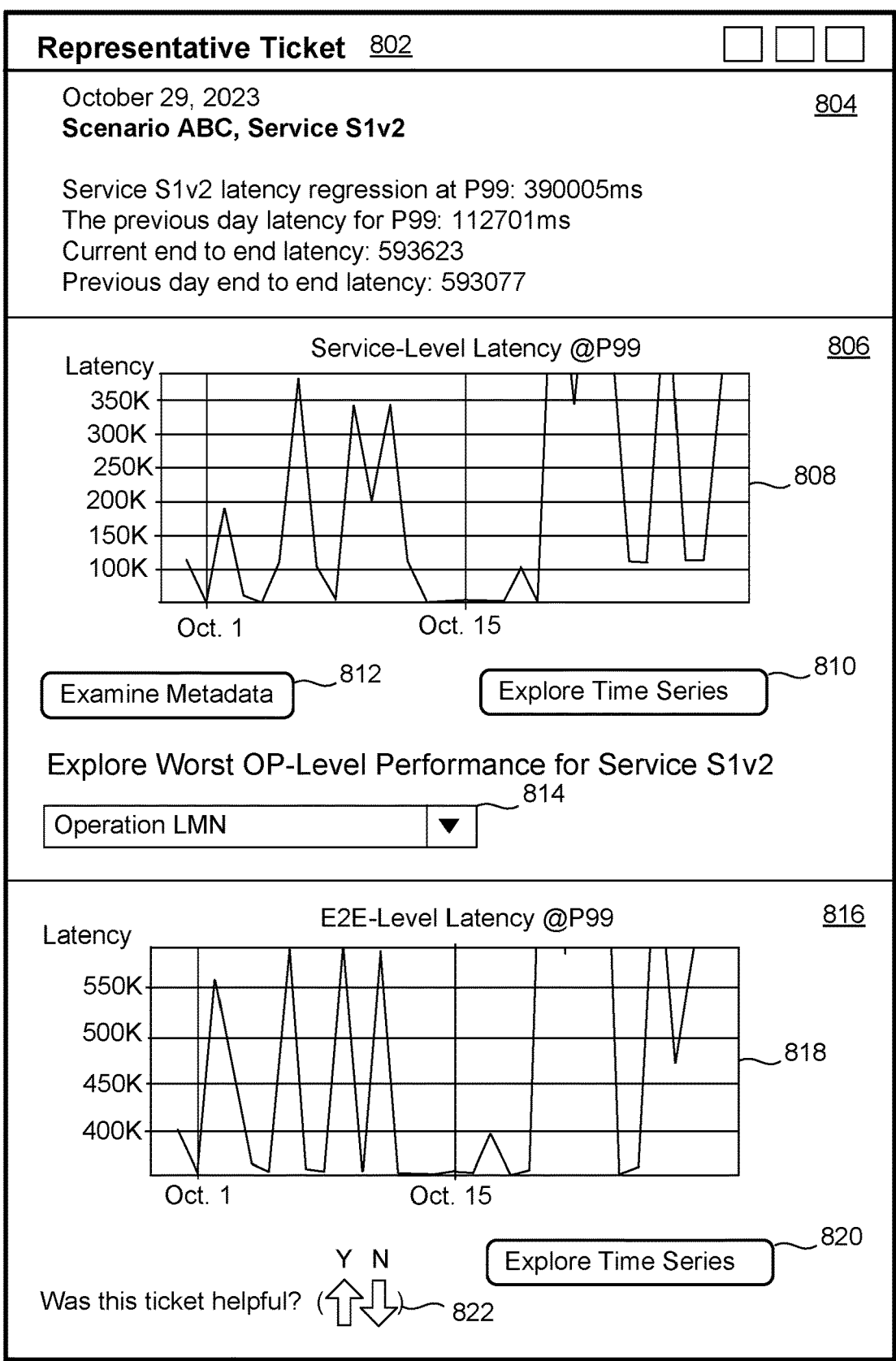
FIG. 8 shows an illustrative report produced by the computing system of FIG. 1. The report describes an incident associated with a particular provisioning action.

FIG. 8 shows an illustrative report 802 (also referred to as a ticket) generated by the ticket-generating component 126, as presented on a user interface presentation of a display device. The report 802 includes a first section 804 that provides high-level information regarding the reported incident, such as an identification of the provisioning action (ABC) and the service (S1v2) associated with the incident. "v2" refers to the particular version of the service S1. The service S1v2 pertains to a particular control node of the hierarchical control plane 114. Overall, the report 802 provides guidance in improving the performance of the control node, e.g., by correct malfunctioning equipment and/or software used by the service S1v2.

The report 802 includes a second section 806 that shows a service-level distribution information 808 for the service S1v2, which was identified by the service-level latency-analysis component 308 as potentially responsible for a latency spike in the E2E distribution information. Actuation of a graphical control 810 causes the anomaly detection system 116 to provide an interface (not shown) that enables further exploration of the service-level distribution information 808 (e.g., by accommodating requests to drill down on particular parts of the service-level latency graph, or requests to examine more encompassing portions of the service-level distribution information).

Actuation of a graphical control 812 causes the anomaly detection system 116 to provide an interface (not shown)

that enables exploration of metadata associated with the service-level latency graph. Illustrative metadata includes identifiers (e.g., GUIDs) associated with services, executable operations, and resources that play a role in the incident under consideration. The metadata also includes failure signatures produced by the control plane 114 while processing the request associated with the provisioning action. Actuation of a graphical control 814 causes the anomaly detection system 116 to provide an interface that enables further exploration of latency-related information associated with any executable operations involved in the service S1*v*2. This latency-related information includes operation-level distribution information.

The report 802 includes a third section 816 that shows an E2E-level distribution information 818 (also referred to as an instance of end-to-end distribution information) for the provisioning action as a whole produced by the E2E latency analysis component 306. Actuation of a graphical control 820 causes the anomaly detection system 116 to provide an interface (not shown) that enables further exploration of the E2E-level distribution information 818 (e.g., by accommodating requests to drill down on particular parts of the E2E-level latency graph, or requests to examine more encompassing portions of the E2E-level distribution information). Actuation of a graphical control 822 causes the anomaly detection system 116 to register a vote, indicating whether the report 802 was considered helpful or unhelpful in resolving a potential latency-related anomaly. One reason why a No vote may be entered is because the report is assessed as describing a non-actionable incident. Another reason why a No vote may be entered is because the information conveyed by the report 802 does not lead to the successful resolution of the suspected anomaly.

Although not shown, some reports identify two or more incidents that have an identifiable nexus. Any such report duplicates the type of information shown in FIG. 8 for each incident that is identified.

Figure 9:
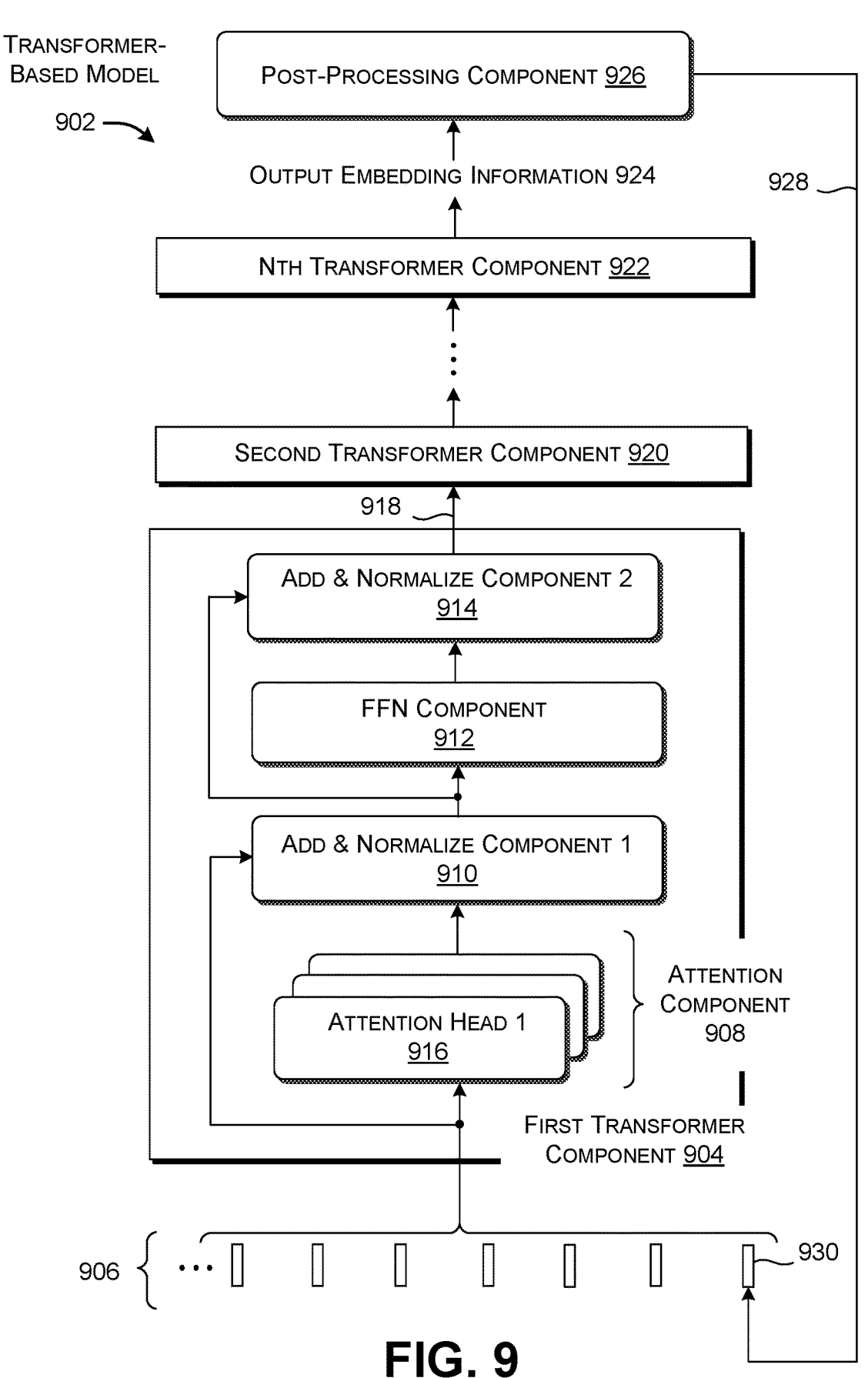
FIG. 9 shows an illustrative language model for use in the computing system of FIG. 1.

FIG. 9 shows a transformer-based language model ("language model") 902 for implementing the language model 140 referenced by FIG. 1. The language model 902 is composed, in part, of a pipeline of transformer components provided at different layers of neural network. A first transformer component 904 corresponds to one such layer. FIG. 9 provides details regarding one way to implement the first transformer component 904. Although not specifically illustrated, other transformer components of the language model 902 have the same architecture and perform the same functions as the first transformer component 904 (but are governed by separate sets of weights).

The language model 902 commences its operation with the receipt of input information, such as a passage of text. The prompt includes a series of linguistic tokens that express the types of information described above with reference to FIG. 1. In some examples, a "token" refers to a unit of text having any granularity, such as an individual word, a word fragment produced by byte pair encoding (BPE), a character n-gram, a word fragment identified by the WordPiece or SentencePiece algorithm, etc. To facilitate explanation, assume that each token corresponds to a complete word. The principles set forth herein, however, are not limited to the processing of text information; in other examples, the language model 902 operates on any of: audio information, image information, video information, sensor information, and so on, or any combination thereof.

Next, an embedding component (not shown) maps the sequence of tokens into respective token embeddings. For example, the embedding component produces one-hot vectors that describe the tokens, and then maps the one-hot vectors into the token embeddings using a machine-trained linear transformation. The embedding component then adds position information (and, in some cases, segment information) to the respective token embeddings to produce position-supplemented embedding vectors 906. The position information added to each token embedding describes the embedding vector's position in the sequence of token embeddings.

The first transformer component 904 operates on the position-supplemented embedding vectors 906. In some implementations, the first transformer component 904 includes, in order, an attention component 908, a first add-and-normalize component 910, a feed-forward neural network (FFN) component 912, and a second add-and-normalize component 914. Each of these components correspond to sub-layers of the neural network The attention component 908 determines how much emphasis should be placed on parts of input information when interpreting other parts of the input information. Consider, for example, a sentence that reads: "I asked the professor a question, but he could not answer it." When interpreting the word "it," the attention component 908 will determine how much weight or emphasis should be placed on each of the words of the sentence. The attention component 908 will find that the word "question" is most significant.

The attention component 908 performs attention analysis using the following equation:

$$\text{Attention}(Q, K, V) = \text{softmax}\left(\frac{QK^T}{\sqrt{d_k}}\right)V. \tag{2}$$

The attention component 908 produces query information Q by multiplying the position-supplemented embedding vectors 906 by a query weighting matrix $W^Q$. Similarly, the attention component 908 produces key information K and value information V by multiplying the position-supplemented embedding vectors 906 by a key weighting matrix $W^K$ and a value weighting matrix $W^V$, respectively. To execute Equation (2), the attention component 908 takes the dot product of Q with the transpose of K, and then divides the dot product by a scaling factor $\sqrt{d}$, to produce a scaled result. The symbol d represents the dimensionality of Q and K. The attention component 908 takes the Softmax (normalized exponential function) of the scaled result, and then multiplies the result of the Softmax operation by V, to produce attention output information. In some cases, the attention component 908 is said to perform masked attention insofar as the attention component 908 masks output token information that, at any given time, has not yet been determined. Background information regarding the general concept of attention is provided in Vaswani, et al., "Attention Is All You Need," in 31st Conference on Neural Information Processing Systems (NIPS 2017), 2017, 9 pages.

Note that FIG. 9 shows that the attention component 908 is composed of plural attention heads, including a representative attention head 916. Each attention head performs the computations specified by Equation (2), but with respect to a particular representational subspace that is different than the subspaces of the other attention heads. To accomplish this operation, the attention heads perform the computations described above using different respective sets of query, key, and value weight matrices. Although not shown, the attention component 908 concatenates the output results of the attention component's separate attention heads, and then multiplies the results of this concatenation by another weight matrix $W^O$.

The add-and-normalize component 910 includes a residual connection that combines (e.g., sums) input information fed to the attention component 908 with the output information generated by the attention component 908. The add-and-normalize component 910 then normalizes the output information generated by the residual connection, e.g., by layer-normalizing values in the output information based on the mean and standard deviation of those values, or by performing root-mean-squared normalization. The other add-and-normalize component 914 performs the same functions as the first-mentioned add-and-normalize component 910. The FFN component 912 transforms input information to output information using a feed-forward neural network having any number of layers.

The first transformer component 904 produces output embedding information 918. A series of other transformer components (920, . . . , 922) perform the same functions as the first transformer component 904, each operating on output embedding information produced by its immediately preceding transformer component. Each transformer component uses its own level-specific set of machine-trained weights. The final transformer component 922 in the language model 902 produces final output embedding information 924.

In some implementations, a post-processing component 926 performs post-processing operations on the final output embedding information 924. For example, the post-processing component 926 performs a machine-trained linear transformation on the final output embedding information 924, and processes the results of this transformation using a Softmax component (not shown). The language model 902 uses the output of the post-processing component 926 to predict the next token in the input sequence of tokens. In some applications, the language model 902 performs this task using a greedy selection approach (e.g., by selecting the token having the highest probability), or by using the beam search algorithm (e.g., by traversing a tree that expresses a search space of candidate next tokens).

In other implementations (such as BERT-based implementations), the post-processing component 926 represents a classification component that produces a classification result. In some implementations, the classification component is implemented using a fully-connected feed-forward neural network having one or more layers followed by a Softmax component. General background information on BERT-based models is provided by Devlin, et al., "BERT: Pre-training of Deep Bidirectional Transformers for Language Understanding," arXiv, arXiv:1810.04805v2 [cs.CL], May 24, 2019, 16 pages.

In some implementations, the language model 902 operates in an auto-regressive manner, as indicated by the loop 928. To operate in this way, the language model 902 appends a predicted token to the end of the sequence of input tokens, to provide an updated sequence of tokens. The predicted token leads to the production of a new position-supplemented vector 930. In a next pass, the language model 902 processes the updated sequence of position-supplemented vectors to generate a next predicted token. The language model 902 repeats the above process until it generates a specified stop token.

The above-described implementation of the language model 902 relies on a decoder-only architecture. Other implementations of the language model 902 use an encoder-decoder transformer-based architecture. Here, a transformer-based decoder receives encoder output information produced by a transformer-based encoder, together with decoder input information. The encoder output information specifically includes key-value (KV) information that serves as input to the attention components of the decoder (except the first transformer component).

In some implementations, the language model 902 corresponds to a pre-trained language model. One example of publicly-available pre-trained language model is described in Touvron, et al., "LLaMA: Open and Efficient Foundation Language Models," arXiv, arXiv:2302.13971v1 [cs.CL], Feb. 27, 2023, 27 pages. Another example of a publicly-available pre-trained model language model is the BLOOM model described in Scao, et al., "BLOOM: A 176B-Parameter Open-Access Multilingual Language Model," arXiv, arXiv:2211.05100v2 [cs.CL], Dec. 11, 2022, 62 pages. In some examples, the pre-training of a generative language model includes unsupervised training using language modeling (e.g., predicting the next word in a given text passage and comparing the prediction with the actual next word) and supervised training (e.g., predicting an output result and comparing the prediction with a ground-truth result). In other implementations, the language model 902 represents one of the GPT family of language models provided by OPENAI, INC. of San Francisco, California, such as the ChatGPT model.

In some implementations, the classification component used in a BERT-based model is trained based on a task-specific collection of training examples. For example, a training system trains a classification component (e.g., corresponding to the post-processing component 926) by applying supervised training on a set of training examples. Each positive training example specifies an illustrative prompt and correct label information associated with the prompt. The training system uses any loss function, such as cross entropy, to compute loss information, which reflects the difference between model-computed label information and ground-truth label information (specified in the training examples). The training system updates the weights of the classification component based on the loss information using stochastic gradient descent in combination with back propagation. In other implementations, the training system uses the above approach to fine-tune the pre-trained language model itself, which is subsequently used in the above-described auto-regressive mode. In some implementations of the BERT-based mode, the training system trains both the classification component and the preceding language model components.

Other implementations of the language model 902 use other kinds of machine-trained models besides, or in addition to, the particular transformer-based architecture shown in FIG. 9. The other machine-trained models include any of convolutional neural networks (CNNs), recurrent neural networks (RNNs), fully-connected feed-forward neural networks (FFNS), stable diffusion models, etc., or any combination thereof.

FIGS. 10 and 11 show two processes that represent an overview of the operation of the computing system of FIG. 1. Each of the processes is expressed as a series of operations performed in a particular order. But the order of these operations is to be understood as representative, and the operations are capable of being varied in other implementations. Further, any two or more operations described below are capable of being performed in a parallel manner. In one implementation, the blocks shown in the processes that pertain to processing-related functions are implemented by the computing equipment described in connection with FIGS. 12 and 13.

More specifically, FIG. 10 shows a process 1002 for detecting and responding to latency deviations of a provisioning action in a network-accessible computing platform (e.g., the computing platform 104). In block 1004, the anomaly detection system 116 generate, for the provisioning action, latency profile information including service-level distribution information that expresses distribution of amounts of time that have been taken to perform each of a plurality of services included in the provisioning action. The service-level distribution information is generated based at least on a summation of non-overlapping portions of latencies of a plural of executable operations included in each service of two or more of the plurality of services. In block 1006, the anomaly detection system 116 determines that a reportable incident has occurred that is attributable to a particular service of the plurality of services based on a deviation in the service-level distribution information that satisfies a prescribed test. In block 1008, the anomaly detection system 116 adjusts one or more control settings that govern determination that reportable incidents have occurred based on the reportable incident, e.g., based on feedback from the language model 140.

FIG. 11 shows another process 1004 for detecting and responding to latency deviations of a provisioning action in a network-accessible computing platform (e.g., the computing platform 104). In block 1104, the anomaly detection system 116 receives latency measurements that express amounts of time it has taken to repeatedly perform a provisioning action in the network-accessible computing platform, the provisioning action including plural services. In block 1106, the anomaly detection system 116 stores the latency measurements in a data store (e.g., the data store (120). In block 1108, the anomaly detection system 116 generates, based on the latency measurements, end-to-end-level distribution information that expresses distributions of amounts of time that have been taken to perform the provisioning action, and service-level distribution information that expresses distribution of amounts of time it has taken to perform a particular service of the plurality of services. In block 1110, the anomaly detection system determines that a reportable incident has occurred based on a finding that a first deviation has occurred in the end-to-end distribution information at a particular percentile, and that a second deviation has occurred in the service-level distribution information associated with the particular service at the particular percentile. The particular service is used at a particular control node of a hierarchical control plane associated with the network-accessible computing platform, and the reportable incident provides guidance in improving performance of the particular service.

FIG. 12 shows a process 1202 that sets forth one approach to performing the consulting operation of block 1010 of FIG. 10. In block 1204, the anomaly detection system 116 in cooperation with the prompt-generating component 142 generates a prompt (e.g., the prompt 144) that expresses a current incident expressed in a report. In block 1206, the anomaly detection system 1116 in cooperation with the prompt-generating component 142 sends the prompt to a machine-trained language model (e.g., the language model 106). In block 1208, the anomaly detection system 116 receives a response from the machine-trained language model to the prompt, the response including label information that indicates whether or not the current incident is a false positive incident for which no action need be taken.

FIG. 13 shows computing equipment 1302 that, in some implementations, is used to implement the computing system 102. The computing equipment 1302 includes a set of local devices 1304 coupled to a set of servers 1306 via a computer network 1308. Each local device corresponds to any type of computing device, including any of a desktop computing device, a laptop computing device, a handheld computing device of any type (e.g., a smartphone or a tablet-type computing device), a mixed reality device, an intelligent appliance, a wearable computing device (e.g., a smart watch), an Internet-of-Things (IoT) device, a gaming system, an immersive "cave," a media device, a vehicle-borne computing system, any type of robot computing system, a computing system in a manufacturing system, etc. In some implementations, the computer network 1308 is implemented as a local area network, a wide area network (e.g., the Internet), one or more point-to-point links, or any combination thereof.

The bottom-most overlapping box in FIG. 13 indicates that the functionality of the computing system 102 is capable of being spread across the local devices 1304 and/or the servers 1306 in any manner. In some implementations, for instance, the computing platform 104 and the language model 140 are implemented by one or more network-accessible systems, implemented by the servers 1306, and the anomaly detection system 116 and/or the prompt-generating component 142 are implemented by one or more local devices. In other implementations, the anomaly detection system 116 and/or the prompt-generating component 142 are also implemented by the servers 306.

Figure 14:
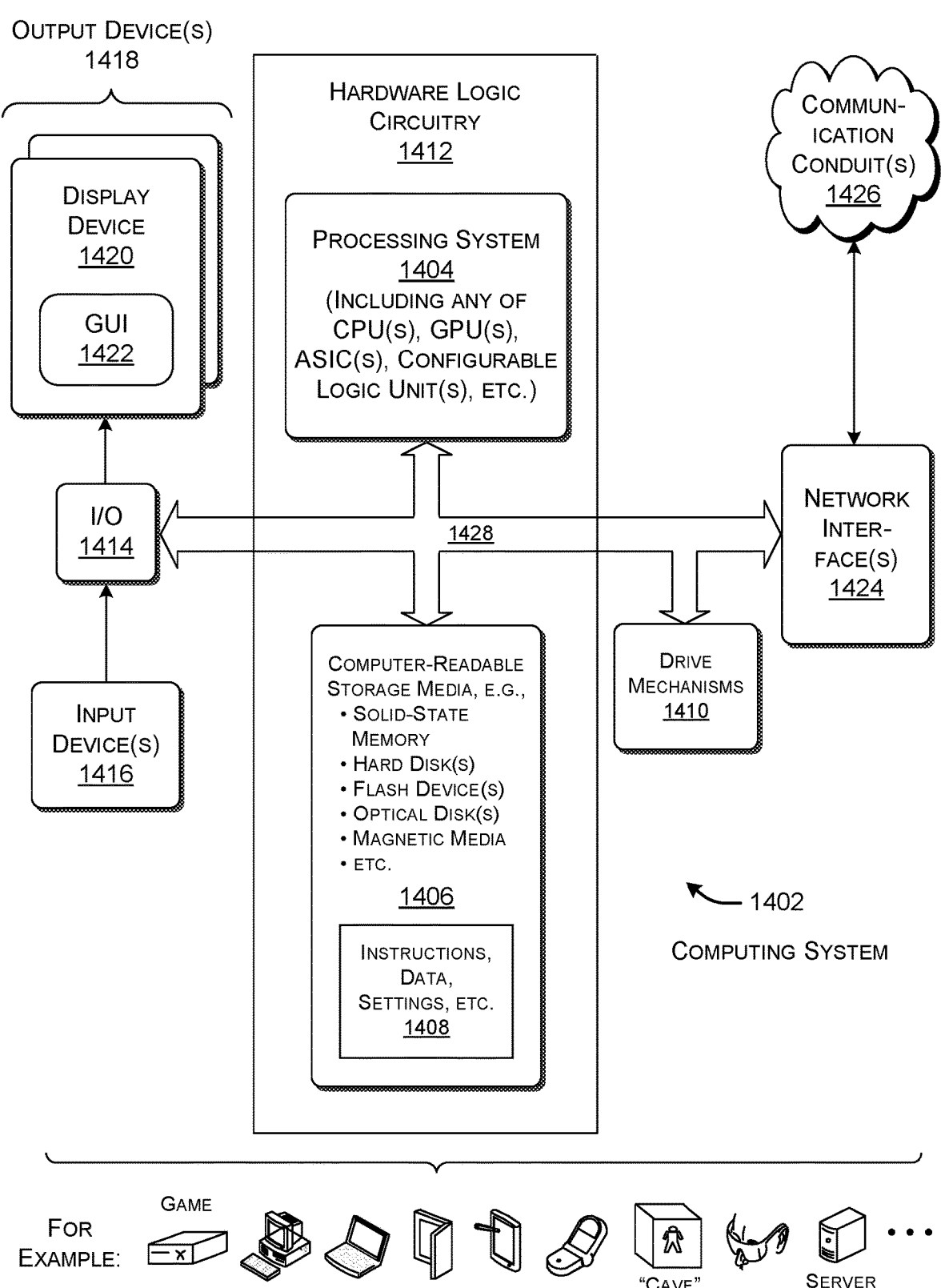
FIG. 14 shows an illustrative type of computing system that, in some implementations, is used to implement any aspect of the features shown in the foregoing drawings.

FIG. 14 shows a computing system 1402 that, in some implementations, is used to implement any aspect of the mechanisms set forth in the above-described figures. For instance, in some implementations, the type of computing system 1402 shown in FIG. 14 is used to implement any local computing device or any server shown in FIG. 14. In all cases, the computing system 1402 represents a physical and tangible processing mechanism.

The computing system 1402 includes a processing system 1404 including one or more processors. The processor(s) include one or more central processing units (CPUs), and/or one or more graphics processing units (GPUs), and/or one or more application specific integrated circuits (ASICs), and/or one or more neural processing units (NPUs), and/or one or more tensor processing units (TPUs), etc. More generally, any processor corresponds to a general-purpose processing unit or an application-specific processor unit.

The computing system 1402 also includes computer-readable storage media 1406, corresponding to one or more computer-readable media hardware units. The computer-readable storage media 1406 retains any kind of information 1408, such as machine-readable instructions, settings, model weights, and/or other data. In some implementations, the computer-readable storage media 1406 includes one or more solid-state devices, one or more hard disks, one or more optical disks, etc. Any instance of the computer-readable storage media 1406 uses any technology for storing and retrieving information. Further, any instance of the computer-readable storage media 1406 represents a fixed or removable unit of the computing system 1402. Further, any instance of the computer-readable storage media 1406 provides volatile and/or non-volatile retention of information. The specific term "computer-readable storage medium" or "storage device" expressly excludes propagated signals in transit; a computer-readable storage medium or storage device is "non-transitory" in this regard.

The computing system 1402 utilizes any instance of the computer-readable storage media 1406 in different ways. For example, in some implementations, any instance of the computer-readable storage media 1406 represents a hardware memory unit (such as random access memory (RAM)) for storing information during execution of a program by the computing system 1402, and/or a hardware storage unit (such as a hard disk) for retaining/archiving information on a more permanent basis. In the latter case, the computing system 1402 also includes one or more drive mechanisms 1410 (such as a hard drive mechanism) for storing and retrieving information from an instance of the computer-readable storage media 1406.

In some implementations, the computing system 1402 performs any of the functions described above when the processing system 1404 executes computer-readable instructions stored in any instance of the computer-readable storage media 1406. For instance, in some implementations, the computing system 1402 carries out computer-readable instructions to perform each block of the processes described with reference to FIGS. 10-12. FIG. 14 generally indicates that hardware logic circuitry 1412 includes any combination of the processing system 1404 and the computer-readable storage media 1406.

In addition, or alternatively, the processing system 1404 includes one or more other configurable logic units that perform operations using a collection of logic gates. For instance, in some implementations, the processing system 1404 includes a fixed configuration of hardware logic gates, e.g., that are created and set at the time of manufacture, and thereafter unalterable. In addition, or alternatively, the processing system 1404 includes a collection of programmable hardware logic gates that are set to perform different application-specific tasks. The latter category of devices includes programmable array logic devices (PALs), generic array logic devices (GALs), complex programmable logic devices (CPLDs), field-programmable gate arrays (FPGAs), etc. In these implementations, the processing system 1404 effectively incorporates a storage device that stores computer-readable instructions, insofar as the configurable logic units are configured to execute the instructions and therefore embody or store these instructions.

In some cases (e.g., in the case in which the computing system 1402 represents a user computing device), the computing system 1402 also includes an input/output interface 1414 for receiving various inputs (via input devices 1416), and for providing various outputs (via output devices 1418). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 1420 and an associated graphical user interface presentation (GUI) 1422. The display device 1420 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 1402 also includes one or more network interfaces 1424 for exchanging data with other devices via one or more communication conduits 1426. One or more communication buses 1428 communicatively couple the above-described units together.

The communication conduit(s) 1426 is implemented in any manner, e.g., by a local area computer network, a wide area computer network (e.g., the Internet), point-to-point connections, or any combination thereof. The communication conduit(s) 1426 include any combination of hardwired links, wireless links, routers, gateway functionality, name servers, etc., governed by any protocol or combination of protocols.

FIG. 14 shows the computing system 1402 as being composed of a discrete collection of separate units. In some cases, the collection of units corresponds to discrete hardware units provided in a computing device chassis having any form factor. FIG. 14 shows illustrative form factors in its bottom portion. In other cases, the computing system 1402 includes a hardware logic unit that integrates the functions of two or more of the units shown in FIG. 14. For instance, in some implementations, the computing system 1402 includes a system on a chip (SoC or SOC), corresponding to an integrated circuit that combines the functions of two or more of the units shown in FIG. 14.

The following summary provides a set of illustrative examples of the technology set forth herein.

(A1) According to one aspect, a method (e.g., the process 1002) is described for detecting and responding to latency deviations of a provisioning action in a network-accessible computing platform. The method includes generating (e.g., in block 1004), for the provisioning action, latency profile information including service-level distribution information that expresses distribution of amounts of time that have been taken to perform each of a plurality of services included in the provisioning action. The service-level distribution information is generated based at least on a summation of non-overlapping portions of latencies of a plural of executable operations included in each service of two or more of the plurality of services. The method further includes determining (e.g., in block 1006) that a reportable incident has occurred that is attributable to a particular service of the plurality of services based on a deviation in the service-level distribution information that satisfies a prescribed test. The method further includes adjusting (e.g., in block 1008) one or more control settings that govern determination that reportable incidents have occurred based on the reportable incident.

(A2) According to some implementations of the method of A1, the method further includes generating a report that identifies the reportable incident that conveys service-level distribution information associated with the particular service.

(A3) According to some implementations of the method of A2, the report also provides access to operation-level information regarding at least one executable operation associated with the particular service.

(A4) According to some implementations of the method of A1 or A2, the method further includes consulting a language model to determine whether the reportable incident set forth in the report is a false positive. The adjusting is based on an outcome of the consulting.

(A5) According to some implementations of the method of A4, reportable incident is a current incident. The method further includes: obtaining current incident data that expresses the current incident; obtaining one or more comments associated with the current incident, which respond to the report; determining that prior incident data matches the current incident data, the prior incident data expressing one or more prior incidents; generating a prompt that expresses the current incident data, the prior incident data, and the one or more comments; sending the prompt to a machine-trained language model; and receiving a response from the machine-trained language model to the prompt, the response including label information that indicates whether or not the current incident is a false positive incident for which no action need be taken.

(A6) According to some implementations of the method of A5, the determining that the prior incident data matches the current incident data is performed by determining that a vector representation of the current incident expressed by the current incident data is within a prescribed distance of a vector representation of a prior incident expressed by the prior incident data.

(A7) According to some implementations of the method of A6, a significance of a match between the current incident and the prior incident depends on a length of time between occurrence of the current incident and occurrence of the prior incident.

(A8) According to some implementations of any of the methods of A1-A7, the adjusting one or more control settings includes adjusting a threshold that governs detection and/or reporting of the reportable incidents.

(A9) According to some implementations of any of the methods of A1-A8, the determining that a reportable incident has occurred includes determining that the service-level distribution information for the particular service exhibits a spike in latency having a prescribed magnitude, and that the spike persists a prescribed amount of time over plural sampling periods or that has a prescribed frequency of occurrence over the plural sampling periods.

(A10) According to some implementations of any of the methods of A1-A9, the service-level distribution information for the particular service identifies a particular latency for which a prescribed percentage of latency measurements in a prescribed period have values that are smaller than the particular latency. The method includes determining whether the particular latency satisfies the prescribed test.

(A11) According to some implementations of any of the methods of A1-A10, the latency profile information also includes end-to-end-level distribution information that expresses distribution of end-to-end times over a prescribed sampling period, each end-to-end time being based on an amount of time that has been taken to perform an instance of the provisioning action. Further, the determining that a reportable incident has occurred includes determining that a first deviation has occurred in the end-to-end distribution information at a particular percentile, and that a second deviation has occurred in the service-level distribution information of the particular service of the services at the particular percentile, and that both the first deviation and the second deviation satisfy the prescribed test.

(A12) According to some implementations of any of the methods of A1-A11, the provisioning action is a particular provisioning action. The method further includes consolidating two incidents for presentation in the report as a single incident. The two incidents are associated with different provisioning actions, including the particular provisioning action, in which the particular service is determined to be a contributing factor in the two incidents, or the two incidents pertain to different services associated with the particular provisioning action.

(A13) According to some implementations of any of the methods of A1-A12, the provisioning action is associated with a particular kind of provisioning work that is requested involving creation, updating, deletion, or deallocation of virtual machine functionality, and a region in which the action is to take place. The method is also performed for other provisioning actions associated with other kinds of provisioning work and/or regions.

(A14) According to some implementations of any of the methods of A1-A13, the provisioning action involves execution of services at different hierarchically-arranged levels of a control plane associated with the network-accessible computing platform, and the particular service is associated with a particular control node of the control plane.

(A15) According to some implementations of any of the methods of A1-A14, the method further includes automatically modifying the particular service based on the report.

In yet another aspect, some implementations of the technology described herein include a computing system (e.g., the computing system 1402) that includes a processing system (e.g., the processing system 1404) having a processor. The computing system also includes a storage device (e.g., the computer-readable storage media 1406) for storing computer-readable instructions (e.g., the information 1408). The processing system executes the computer-readable instructions to perform any of the methods described herein (e.g., any individual method of the methods of A1-A15).

In yet another aspect, some implementations of the technology described herein include a computer-readable storage medium (e.g., the computer-readable storage media 1406) for storing computer-readable instructions (e.g., the information 1408). A processing system (e.g., the processing system 1404) executes the computer-readable instructions to perform any of the operations described herein (e.g., the operations in any individual method of the methods of A1-A15).

More generally, any of the individual elements and steps described herein are combinable into any logically consistent permutation or subset. Further, any such combination is capable of being manifested as a method, device, system, computer-readable storage medium, data structure, article of manufacture, graphical user interface presentation, etc. The technology is also expressible as a series of means-plus-format elements in the claims, although this format should not be considered to be invoked unless the phrase "means for" is explicitly used in the claims.

This description may have identified one or more features as optional. This type of statement is not to be interpreted as an exhaustive indication of features that are to be considered optional; generally, any feature is to be considered as an example, although not explicitly identified in the text, unless otherwise noted. Further, any mention of a single entity is not intended to preclude the use of plural such entities; similarly, a description of plural entities in the specification is not intended to preclude the use of a single entity. As such, a statement that an apparatus or method has a feature X does not preclude the possibility that it has additional features. Further, any features described as alternative ways of carrying out identified functions or implementing identified mechanisms are also combinable together in any combination, unless otherwise noted.

In terms of specific terminology, the phrase "configured to" encompasses various physical and tangible mechanisms for performing an identified operation. The mechanisms are configurable to perform an operation using the hardware logic circuitry 1412 of FIG. 14. The term "logic" likewise encompasses various physical and tangible mechanisms for performing a task. For instance, each processing-related operation illustrated in the flowcharts of FIGS. 10 and 11 corresponds to a logic component for performing that operation.

Further, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of" or the like, is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. The phrase "any combination thereof" refers to any combination of two or more elements in a list of elements. Further, the terms "comprising," "including," and "having" are open-ended terms that are used to identify at least one part of a larger whole, but not necessarily all parts of the whole. A "set" is a group that includes one or more members. The phrase "A corresponds to B" means "A is B" in some contexts. Finally, the terms "exemplary" or "illustrative" refer to one implementation among potentially many implementations.

In closing, the functionality described herein is capable of employing various mechanisms to ensure that any user data is handled in a manner that conforms to applicable laws, social norms, and the expectations and preferences of individual users. For example, the functionality is configurable to allow a user to expressly opt in to (and then expressly opt out of) the provisions of the functionality. The functionality is also configurable to provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for detecting and responding to latency deviations of a provisioning action in a network-accessible computing platform, comprising:
   generating, for the provisioning action, latency profile information, the provisioning action invoking a plurality of services,
   the latency profile information including end-to-end distribution information that expresses a distribution of amounts of time that have been taken to repeatedly perform an entirety of the provisioning action, and service-level distribution information that expresses a distribution of amounts of time that have been taken to repeatedly perform a particular service of the plurality of services;
   determining that a reportable incident has occurred that is attributable to the particular service based on a first deviation in the service-level distribution information of the particular service that satisfies a prescribed test and which is confirmed by a second deviation in the end-to-end distribution information; and
   adjusting one or more control settings that govern determination that reportable incidents have occurred based on the reportable incident.

2. The method of claim 1, further comprising generating a report that identifies the reportable incident that conveys information regarding the service-level distribution information associated with the particular service.

3. The method of claim 2, wherein the report also provides access to operation-level information regarding at least one executable operation associated with the particular service.

4. The method of claim 2, further comprising consulting a language model to determine whether the reportable incident set forth in the report is a false positive.

5. The method of claim 4, wherein the reportable incident is a current incident, and wherein the consulting comprises:
   obtaining current incident data that expresses the current incident;
   obtaining one or more comments associated with the current incident, which respond to the report;
   determining that prior incident data matches the current incident data, the prior incident data expressing one or more prior incidents;
   generating a prompt that expresses the current incident data, the prior incident data, and the one or more comments;
   sending the prompt to a machine-trained language model; and
   receiving a response from the machine-trained language model to the prompt, the response including label information that indicates whether or not the current incident is a false positive incident for which no action need be taken.

6. The method claim 5, wherein the determining that the prior incident data matches the current incident data is performed by determining that a vector representation of the current incident expressed by the current incident data is within a prescribed distance of a vector representation of a prior incident expressed by the prior incident data.

7. The method of claim 6, wherein a significance of a match between the current incident and the prior incident depends on a length of time between occurrence of the current incident and occurrence of the prior incident.

8. The method of claim 1, wherein the adjusting one or more control settings includes adjusting a threshold that governs detection and/or reporting of the reportable incidents.

9. The method of claim 1, wherein the determining that a reportable incident has occurred includes, in part, determining that the service-level distribution information for the particular service exhibits a spike in latency having a prescribed magnitude, and that the spike persists a prescribed amount of time over plural sampling periods or that has a prescribed frequency of occurrence over the plural sampling periods.

10. The method of claim 1,
   wherein each of the end-to-end distribution information and service-level distribution information identifies a particular latency for which a particular percentile of latency measurements in a prescribed period have values that are smaller than the particular latency, and
   wherein the determining that a reportable incident has occurred includes determining that the second deviation has occurred in the end-to-end distribution information at the particular percentile, and that the first deviation has occurred in the service-level distribution information of the particular service of the services at the particular percentile, and that both the first deviation and the second deviation satisfy the prescribed test.

11. The method of claim 1, wherein the provisioning action is a particular provisioning action, further comprising consolidating two incidents for presentation in a report as a single incident, the two incidents being associated with different provisioning actions, one of which includes the particular provisioning action, in which the particular service is determined to be a contributing factor in the two incidents, or the two incidents pertaining to different services associated with the particular provisioning action.

12. The method of claim 1, wherein the provisioning action involves creation, updating, deletion, or deallocation of virtual machine functionality.

13. The method of claim 1, wherein the provisioning action involves execution of services at different hierarchically-arranged levels of a control plane associated with the network-accessible computing platform, and wherein the particular service is associated with a particular control node of the control plane.

14. The method of claim 1, further comprising automatically modifying the particular service based on the reportable incident.

15. The method of claim 1, wherein the generating generates an instance of service-level distribution information for each service of the plurality of services.

16. The method of claim 1, wherein the reportable incident occurs when the first and second deviations occur at a same percentile in the end-to-end distribution information and the service-level distribution, respectively.

17. A computing system for detecting and responding to latency deviations of a provisioning action in a network-accessible computing platform, comprising:

an instruction data store for storing computer-readable instructions; and a processing system for executing the computer-readable instructions in the data store, to perform operations including:

generating, for the provisioning action, latency profile information including service-level distribution information that expresses a distribution of amounts of time that have been taken to perform each of a plurality of services included in the provisioning action;

determining that a reportable incident has occurred that is attributable to a particular service of the plurality of services based on a deviation in the service-level distribution information that satisfies a prescribed test;

generating a report that identifies the reportable incident that conveys information regarding the service-level distribution information associated with the particular service, wherein the reportable incident is a current incident;

obtaining current incident data that expresses the current incident;

obtaining one or more comments associated with the current incident, which respond to the report;

determining that prior incident data matches the current incident data, the prior incident data expressing one or more prior incidents;

generating a prompt that expresses the current incident data, the prior incident data, and the one or more comments;

sending the prompt to a machine-trained language model;

receiving a response from the machine-trained language model to the prompt, the response including label information that indicates whether or not the current incident is a false positive incident for which no action need be taken; and adjusting one or more control settings that govern determination that reportable incidents have occurred based on the response.

18. The computing system of claim 17, wherein the determining that the prior incident data matches the current incident data is performed by determining that a vector representation of the current incident expressed by the current incident data is within a prescribed distance of a vector representation of a prior incident expressed by the prior incident data.

19. The computing system of claim 18, wherein a significance of a match between the current incident and the prior incident depends on a length of time between occurrence of the current incident and occurrence of the prior incident.

20. A computer-readable storage medium for storing computer-readable instructions, a processing system executing the computer-readable instructions to perform operations, the operations comprising:

receiving latency measurements that express amounts of time that have been taken to repeatedly perform a provisioning action in a network-accessible computing platform, the provisioning action including plural services;

storing the latency measurements in a data store;

generating, based on the latency measurements, end-to-end distribution information that expresses a distribution of amounts of time that have been taken to perform the provisioning action, and service-level distribution information that expresses a distribution of amounts of time have been taken to perform a particular service of the plurality of services, wherein each of the end-to-end distribution information and the service-level distribution information identifies a particular latency for which a particular percentile of latency measurements have values that are smaller than the particular latency; and determining that a reportable incident has occurred based on a finding that a deviation has occurred in the end-to-end distribution information at the particular percentile, and that another deviation has occurred in the service-level distribution information associated with the particular service at the particular percentile, the particular service being used at a particular control node of a hierarchical control plane associated with the network-accessible computing platform, and the reportable incident providing guidance in improving performance of the particular service.

\* \* \* \* \*